US012260747B2

(12) United States Patent
Monteuuis et al.

(10) Patent No.: US 12,260,747 B2
(45) Date of Patent: Mar. 25, 2025

(54) MISBEHAVIOR DETECTION IN A VEHICLE-TO-EVERYTHING (V2X) MANEUVER COORDINATION MESSAGE

(71) Applicant: QUALCOMM Incorporated, San Diego, CA (US)

(72) Inventors: Jean-Philippe Monteuuis, Northborough, MA (US); Seung Ryul Yang, San Diego, CA (US); Jonathan Petit, Wenham, MA (US); Mohammad Raashid Ansari, Lowell, MA (US); Cong Chen, Shrewsbury, MA (US)

(73) Assignee: QUALCOMM Incorporated, San Diego, CA (US)

( * ) Notice: Subject to any disclaimer, the term of this patent is extended or adjusted under 35 U.S.C. 154(b) by 207 days.

(21) Appl. No.: 17/810,680

(22) Filed: Jul. 5, 2022

(65) Prior Publication Data
US 2024/0013655 A1   Jan. 11, 2024

(51) Int. Cl.
G08G 1/01 (2006.01)
H04W 4/40 (2018.01)

(52) U.S. Cl.
CPC ............ *G08G 1/0133* (2013.01); *H04W 4/40* (2018.02)

(58) Field of Classification Search
CPC .............................. G08G 1/0133; H04W 4/40
USPC ......................................................... 340/933
See application file for complete search history.

(56) References Cited

U.S. PATENT DOCUMENTS

| 2013/0166157 | A1* | 6/2013 | Schleicher | ........... A01D 43/086 701/50 |
| 2015/0052352 | A1* | 2/2015 | Dolev | ................... H04L 9/3278 713/156 |
| 2016/0119151 | A1* | 4/2016 | Park | ..................... H04W 12/043 713/158 |

(Continued)

FOREIGN PATENT DOCUMENTS

| CN | 114297222 | * | 1/2022 |
| CN | 114297222 A | | 4/2022 |

OTHER PUBLICATIONS

International Search Report and Written Opinion—PCT/US2023/019740—ISA/EPO—Sep. 11, 2023. 19 pages.

(Continued)

*Primary Examiner* — Kerri L McNally
*Assistant Examiner* — Thang D Tran
(74) *Attorney, Agent, or Firm* — Polsinelli

(57) ABSTRACT

Various embodiments include methods and systems for recognizing misbehavior detection in a vehicle-to-everything (V2X) maneuver coordination message. Various embodiments may include a V2X system of a vehicle receiving a maneuver coordination message, performing a test for misbehavior on the maneuver coordination message, and taking an action in response to the test identifying misbehavior associated with the maneuver coordination message. Various embodiments may include a network computing device of a V2X network receiving a plurality of maneuver coordination messages from a plurality of vehicles, identifying an inconsistency among the plurality of maneuver coordination messages, identifying a misbehavior condition in response to identifying the inconsistency among the plurality of maneuver coordination messages, and taking an action in response to identifying the misbehavior condition.

30 Claims, 20 Drawing Sheets

(56) References Cited

U.S. PATENT DOCUMENTS

| | | | |
|---|---|---|---|
| 2016/0224951 A1* | 8/2016 | Hoffberg | G06Q 40/06 |
| 2018/0136655 A1* | 5/2018 | Kim | B60N 2/0029 |
| 2018/0257647 A1* | 9/2018 | Jurca | G01S 13/931 |
| 2018/0299274 A1* | 10/2018 | Moghe | G01C 21/3896 |
| 2018/0341706 A1* | 11/2018 | Agrawal | G06V 20/48 |
| 2019/0116048 A1* | 4/2019 | Chen | H04L 9/0819 |
| 2019/0156678 A1* | 5/2019 | Cole | G06V 20/52 |
| 2019/0312896 A1* | 10/2019 | Petit | H04W 4/46 |
| 2019/0392235 A1* | 12/2019 | Shimizu | G08G 1/096758 |
| 2020/0042013 A1* | 2/2020 | Kelkar | G05D 1/0088 |
| 2020/0137536 A1* | 4/2020 | Nguyen | H04L 27/2607 |
| 2020/0137580 A1* | 4/2020 | Yang | H04W 4/46 |
| 2020/0183416 A1* | 6/2020 | Cheng | H04L 67/12 |
| 2020/0314772 A1* | 10/2020 | Roth-Mandutz | H04W 4/70 |
| 2020/0326726 A1* | 10/2020 | Vassilovski | G08G 1/096725 |
| 2021/0144003 A1* | 5/2021 | Arzelier | H04L 9/3263 |
| 2021/0152991 A1* | 5/2021 | Wu | H04L 1/1864 |
| 2021/0245755 A1* | 8/2021 | Bai | H04W 4/023 |
| 2021/0263166 A1* | 8/2021 | Zheng | G08G 1/0116 |
| 2021/0287536 A1* | 9/2021 | Siltanen | B60W 60/001 |
| 2021/0288778 A1* | 9/2021 | Park | H04L 1/1858 |
| 2022/0014549 A1* | 1/2022 | Yang | H04L 9/3268 |
| 2022/0080977 A1* | 3/2022 | Ucar | B60W 40/09 |
| 2022/0191648 A1* | 6/2022 | Smith | H04W 4/023 |
| 2022/0246031 A1* | 8/2022 | Vijaya Kumar | G08G 1/096741 |
| 2022/0295246 A1* | 9/2022 | Schiegg | H04W 4/40 |
| 2022/0332350 A1* | 10/2022 | Jha | B60W 60/0017 |
| 2022/0386169 A1* | 12/2022 | Llatser Marti | H04W 28/0289 |
| 2023/0017247 A1* | 1/2023 | Hwang | G01S 19/24 |
| 2023/0058086 A1* | 2/2023 | Vassilovski | G08G 1/162 |
| 2023/0319527 A1* | 10/2023 | Shuman | H04W 8/22 370/252 |
| 2023/0345249 A1* | 10/2023 | Ansari | H04L 63/1441 |
| 2023/0360534 A1* | 11/2023 | Avedisov | G08G 1/0112 |

OTHER PUBLICATIONS

Partial International Search Report—PCT/US2023/019740—ISA/EPO—Jul. 21, 2023 10 pages.

SAE: "LS to ETSI TC ITS on SAE Sensor Sharing Service (J3224) and Maneuver Sharing and Coordinating Service (J3186) Standards Development", ETSI Draft; ITS(22)047020, European Telecommunications Standards Institute (ETSI), 650, 650, Route Des Lucioles, F-06921 Sophia-Antipolis Cedex, France, vol. TC ITS Intelligent Transport Systems, Jun. 21, 2022, pp. 1-59, XP014432166, Chapter 5, Appendix F.

* cited by examiner

MISBEHAVIOR DETECTION IN A VEHICLE-TO-EVERYTHING (V2X) MANEUVER COORDINATION MESSAGE

BACKGROUND

Vehicle-to-Everything (V2X) systems support vehicle-to-vehicle and vehicle-to-highway system communications according to communication protocols and messaging formats defined under a relevant standard, such as Cellular Vehicle-to-Everything (C-V2X), Dedicated Short Range Communication (DSRC), and ITS-G5. These standards serve as the foundation for vehicle-based wireless communications, and may be used to support intelligent highways, autonomous and semi-autonomous vehicles, and improve the overall efficiency and safety of the highway transportation systems.

An element of V2X processing systems is the ability for a vehicle to broadcast V2X messages that other vehicles can receive and process to improve traffic safety, such as Basic Safety Messages (BSM) and Cooperative Awareness Messages (CAM). Another such V2X message that enables vehicles to broadcast information about planned maneuvers is a Maneuver Coordination Message (MCM), such as a Maneuver Sharing Coordinating Message. MCM messages may be used in V2X systems and by autonomous and semi-autonomous vehicles to avoid collisions and otherwise perform safe path planning.

SUMMARY

Various aspects include methods that may be performed by a vehicle-to-everything (V2X) vehicle processing system for misbehavior detection in maneuver coordination messages. Various aspects receiving a first maneuver coordination message, performing a test for misbehavior on the first maneuver coordination message, and taking an action in response to the test identifying misbehavior associated with the first maneuver coordination message.

In some aspects, receiving the first maneuver coordination message may include receiving a first maneuver coordination message including a first field and a second field, and performing the test for misbehavior on the first maneuver coordination message and taking an action in response to the test identifying misbehavior associated with the first maneuver coordination message may include transmitting a message associated with the received first maneuver coordination message that includes an indication that information in the first field is inconsistent with information in the second field.

In some aspects, performing the test for misbehavior on the first maneuver coordination message may include determining whether first information in one or more first fields of a first maneuver coordination message is inconsistent with second information in one or more second fields of the first maneuver coordination message, and determining that a misbehavior condition exists in the first maneuver coordination message in response to determining that the first information in one or more first fields of the first maneuver coordination message is inconsistent with the second information in one or more second fields of the first maneuver coordination message.

In some aspects, performing the test for misbehavior on the first maneuver coordination message may include determining whether information in a first maneuver coordination message type field is inconsistent with the presence or absence of one or more second fields.

In some aspects, performing a test for misbehavior on the first maneuver coordination message may include determining whether information in a target road resource (TRR) location field is inconsistent with information in a TRR type field.

In some aspects, performing the test for misbehavior on the first maneuver coordination message may include determining whether information in an executant identifier (ID) field is inconsistent with information in a source ID field or information in a destination ID field.

In some aspects, performing the test for misbehavior on the first maneuver coordination message may include determining whether information in a maximum speed field is inconsistent with a TRR location field.

In some aspects, performing the test for misbehavior on the first maneuver coordination message may include determining whether first information in one or more fields related to an intended maneuver of the vehicle is inconsistent with second information in one or more second fields related to the intended maneuver of the vehicle.

In some aspects, performing the test for misbehavior on the first maneuver coordination message may include determining whether first information in one or more fields related to an intended maneuver of the vehicle or second information in one or more second fields related to the intended maneuver of the vehicle exceeds a threshold.

In some aspects, performing the test for misbehavior on the first maneuver coordination message may include determining whether first information in one or more fields related to an intended maneuver of the vehicle or second information in one or more second fields related to the intended maneuver of the vehicle indicate an overlap of a TRR.

Some aspects may further include receiving a second maneuver coordination message, determining whether first information in the first maneuver coordination message is inconsistent with second information in the second maneuver coordination message, and identifying a misbehavior condition in response to determining that the first information in the first maneuver coordination message is inconsistent with the second information in the second maneuver coordination message. In some aspects, the first maneuver coordination message and the second maneuver coordination message may be out of sequence.

In some aspects, performing a test for misbehavior on the first maneuver coordination message may include determining a quantity of maneuver request denials received from a remote vehicle associated with one or more requests to perform a maneuver sent by the vehicle to the remote vehicle, and identifying a misbehavior condition in response to determining that the quantity of maneuver request denials meets a request denial threshold. Some aspects may further include starting a timer associated with the one or more requests to perform a maneuver sent to the remote vehicle, and increment the quantity of maneuvering request denial upon expiration of the timer without receiving a response from the remote vehicle to the one or more requests.

Some aspects may further include determining whether the remote vehicle is unable to respond to the one or more requests to perform the maneuver, and determining whether the remote vehicle is unable to perform an operation related to the one or more requests to perform the maneuver, in which identifying a misbehavior condition in response to determining that the quantity of maneuver request denials meets a request denial threshold may include identifying the misbehavior condition in response to determining that the remote vehicle is able to respond to the one or more requests to perform the maneuver, and that the remote vehicle is able to perform the operation related to the one or more requests perform the maneuver.

Further aspects include a vehicle V2X processing system including a memory and a processor configured to perform operations of any of the methods summarized above. Further aspects may include a vehicle V2X processing system having means for performing functions corresponding to any of the methods summarized above. Further aspects may include a non-transitory processor-readable storage medium having stored thereon processor-executable instructions configured to cause a processor of a vehicle V2X processing system to perform various operations corresponding to any of the methods summarized above.

Further aspects include methods performed by a network computing device processing system of a V2X network for misbehavior detection in a maneuver coordination message. Such aspects may include receiving a plurality of misbehavior reports indicating maneuver coordination message misbehavior from a plurality of vehicles, identifying an inconsistency among the plurality of misbehavior reports, identifying a misbehavior condition in response to identifying the inconsistency among the plurality of misbehavior reports, and taking an action in response to identifying the misbehavior condition.

In some aspects, identifying the inconsistency among the plurality of misbehavior reports may include identifying a vehicle impersonating multiple vehicles. In some aspects, identifying the inconsistency among the plurality of misbehavior reports may include identifying a vehicle identified in the plurality of maneuver coordination messages has not sent a misbehavior report to the network computing device. Some aspects may further include sending to a second network computing device a request for information related to the identified inconsistency among the plurality of misbehavior reports.

Further aspects include a network computing device processing system including a memory and a processor configured to perform operations of any of the methods summarized above. Further aspects may include a network computing device processing system having various means for performing functions corresponding to any of the methods summarized above. Further aspects may include a non-transitory processor-readable storage medium having stored thereon processor-executable instructions configured to cause a processor of a network computing device processing system to perform various operations corresponding to any of the methods summarized above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

DETAILED DESCRIPTION

Figure 1A:
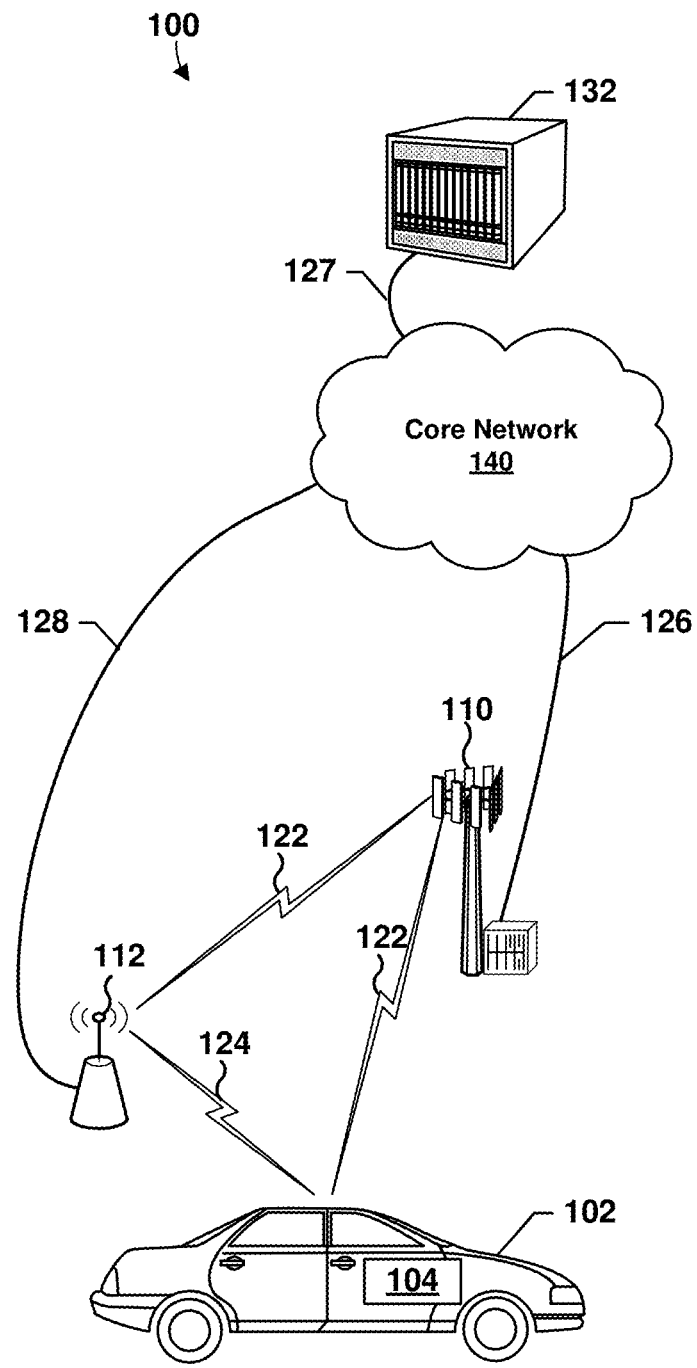
FIG. 1A is a system block diagram illustrating an example communication system suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods, vehicle processing systems, and network computing device processing systems for misbehavior detection in a maneuver coordination message (MCM). In various embodiments, a V2X processing system may include one or more processors and/or other components configured to perform various operations for misbehavior detection in an MCM. In various embodiments, a V2X processing system of a vehicle may perform a test for misbehavior on a received MCM, and may take an action in response to the test identifying misbehavior associated with the MCM. In various embodiments, a processing system of a V2X network computing device may receive a plurality of MCMs from a plurality of vehicles, and process the MCMs to identify an inconsistency among the plurality of MCMs. The processing system of the V2X network computing device may identify a misbehavior condition in response to identifying the inconsistency among the plurality of MCMs, and may take an action in response to identifying the misbehavior condition.

As used herein, the term "vehicle" refers generally to any of an automobile, motorcycle, truck, bus, train, boat, and any other type of vehicle V2X-capable system that may be configured to manage transmission of misbehavior reports.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

In V2X communications, V2X processing systems in vehicles may be configured to send and receive maneuver coordination messages (MCMs). An MCM is a type of V2X message configured to enable a vehicle to transmit information about the vehicle's intended maneuvers or maneuver status to other vehicles and/or a network element of the V2X network, such as a server, a base station, a roadside unit (RSU), or another participant in the V2X communication network. MCMs may be configured according to a technical standard, such as the Maneuver Sharing Coordinating Service (MSCS) or another applicable technical standard, and may be transmitted, received, and/or exchanged according to an applicable communication protocol (for example, a V2X communication protocol). A vehicle referred to herein as a "host vehicle" (HV) may engage in a maneuver negotiation (e.g., a handshake operation) and transmit, receive, and/or exchange MCMs with one or more other vehicles referred to herein as "remote vehicles" (RV). The exchange of MCMs may indicate an intended maneuver of the host vehicle and/or to request a maneuver by a remote vehicle. The remote vehicle may respond to a received MCM with an MCM indicating approval or denial for the host vehicle to perform an intended maneuver, and/or agreement or refusal to perform a maneuver requested by the host vehicle.

Current V2X processing systems may be configured to detect inaccurate or intentionally false information in a BSM or CAM received from another vehicle or from Intelligent Transportation System (ITS) infrastructure devices, such as Roadside Units (RSUs). Misbehaviors detected in such messages may be communicated to other vehicles and network systems in misbehavior reporting messages (MBR).

However, misbehavior detections methods implemented in current V2X processing systems are unable to detect misbehavior in MCMs. Expected messages or a specified sequence of messages in an MCM protocol may provide a point of attack by malicious actors attempting to interrupt or disable safe vehicle operations. Information included in an MCM message field may provide another point of attack for MCM misbehavior. Misbehavior attacks in MCMs may target fields that are used specifically in MCMs, and in some cases may be used exclusively in MCMs. Such misbehaviors in MCMs may include inaccurate or false information about a vehicle's intended maneuvers, attacks targeting the MCM handshake process, and/or interference with another vehicle's intended maneuvers, such as repeated denials of another vehicle's requested maneuvers or stated intended maneuvers. Misbehavior in MCMs may lead to a degradation or deactivation of systems enabling maneuver coordination, decreasing the safety and efficiency of traffic management, and potentially lowering the permitted level of autonomous driving for autonomous vehicles (such as Level 3 (conditional automation), Level 4 (high automation), or Level 5 (full automation) of driving automation as defined by the Society of Automotive Engineers (SAE)).

An MCM protocol typically specifies a sequence of messages, such as a permitted or expected sequence of MCM message types (which may be indicated in a field of an MCM). In some implementations, in addition to a basic protocol used by most vehicles, an MCM protocol may include an emergency protocol that may be used by emergency vehicles (e.g., police, fire, paramedic, and other emergency response vehicles). A V2X processing system may identify an emergency vehicle by a V2X digital certificate associated with a received MCM and identifying the transmitting vehicle as an emergency vehicle.

An MCM may include one or more information fields that may be used by other V2X messages (such as vehicle kinematic information, that also may be included in BSMs and CAMs), as well as one or more information fields that are exclusive to MCMs (such as maneuver data). For example, an MCM may include an MCM type field, a reason code field, a maneuver execution status field, one or more fields including information about a target road resource ("TRR"), and/or the like, that are typically only used in MCMs. Information in the MCM type field may indicate a state of communications among host vehicles and remote vehicles, for example, "maneuver initiation," "request," "response," and "cancellation."

Information in the MCM type field may enable a V2X processing system to configure an MCM with one or more optional fields. For example, an MCM type field with a value of 7 may enable use of a Maneuver Execution Status field in the MCM. As another example, an MCM type field with a value of 0, 1, 3, or 6 may enable use of a Maneuver field in the MCM. As another example, an MCM type field with a value of 2, 4, or 5 may enable use of a Reason Code field in the MCM. MCMs may be transmitted to another vehicle and/or network device, may be broadcast (e.g., MCM broadcasting), and/or may be sent to a specified group of vehicles and/or network devices (e.g., MCM groupcasting).

The information in MCMs may enable vehicles to perform handshake operations or maneuver negotiations over a maneuver proposed by a host vehicle, or a request by a host vehicle that another remote vehicle perform a maneuver. In addition to information about a proposed or requested maneuver, MCMs may indicate reasons for an acceptance or a proposal. For example, a V2X processing system may include information in a Reason Code field indicating the reason for an intended maneuver, for aborting an intended maneuver, or for denying another vehicle's request (a request by a remote vehicle to a host vehicle) to perform or permit a maneuver. For example, a Reason Code may indicate that a vehicle is unable to conform (Reason Code 0), that a requested maneuver is unwanted (Reason Code 1), that the receiving vehicle is unable to understand a request (Reason Code 2), that the vehicle detects erroneous behavior (Reason Code 3), that the vehicle is canceling a maneuver by the Remote Vehicle (Reason Code 4), and/or the like. Currently, Reason Code 3 (erroneous behavior detected) does not enable a distinction between erroneous behavior detected due to failure of an automotive component, or erroneous behavior detected due to a V2X misbehavior attack.

An MCM Reason Code or other suitable information in the MCM indicating a detected misbehavior attack may cause a vehicle V2X processing system to send a misbehavior report to a network computing device such as a Misbehavior Authority. Further, a misbehavior report indicating that one or more MCMs include a Reason Code indicating a detected misbehavior attack may cause a Misbehavior Authority or other suitable network computing device to perform additional processing or analysis of misbehavior reports received from one or more vehicles, and/or to perform a remedial or corrective action against a detected attacker vehicle.

Misbehavior may be introduced in an MCM by a malicious actor or entity in a variety of ways. In a first type of attack, a malicious actor may transmit MCMs with overlapping sub-maneuvers to simulate a fake road accident, to disrupt traffic. For example, the malicious actor may send multiple MCMs falsely purporting to be from the malicious actor vehicle (e.g., as a host vehicle) and one or more nonexistent (fake, ghost) vehicles (e.g., as remote vehicles). The multiple MCMs may indicate that the host vehicle and the fake remote vehicles intend to perform maneuvers or sub-maneuvers that will result overlap in time and space, indicating that a collision is imminent between the malicious actor host vehicle and the fake remote vehicle(s).

Real vehicles in the area become victims of the first type of attack when they detect, and slow down or maneuver to avoid, the (false) imminent collision. The attacker vehicle may ignore MCMs from the real (victim) vehicles attempting cancel the attacker host vehicle's maneuver. For example, the victim vehicles may send an MCM of Message Type 5 to cancel the attacker vehicle's maneuver, and of the attacker vehicle may respond with an MCM of Message Type 4 ignoring the cancellation MCM, or the attacker vehicle may transmit an MCM of Message Type 3 making yet another maneuver reservation. Thus, the attacker's MCM misbehavior forces the victim vehicles to respond by slowing down or maneuvering away from the false imminent collision, causing a disruption in traffic.

In a second type of attack, the attacker aims to create unexpected behaviors by victim vehicles. For example, the attacker may send an MCM with a value in one or more fields of the MCM that is compliant with the relevant MCM message protocol, but nonetheless indicates an impossible condition. For example, the attacker's MCM may indicate that the attacker vehicle intends to perform a maneuver at an announced speed that is inconsistent with information in other fields of the attacker's MCM, such as a time field, a field indicating distance required to complete the announced maneuver, or another suitable MCM information field. Such incorrect or inconsistent values may cause a victim vehicle to incorrectly approve a maneuver by the attacker vehicle, that may cause an accident. Further, processing such inconsistent field values from the attacker MCM may consume processing resources of the victim vehicle.

In a third type of attack, the attacker may attempt to disrupt traffic by performing a "denial of service"-type attack to repeatedly deny or reject maneuver requests from victim vehicle. For example, the attacker vehicle may respond to a maneuver request MCM from a victim vehicle by transmitting responsive MCMs reject all maneuver requests from the victim vehicle. As another example, the attacker vehicle may respond to a maneuver request from a victim vehicle by sending an MCM indicating that the attacker vehicle will perform a maneuver or sub-maneuver that would cause an accident with the victim vehicle, to force the victim vehicle not to perform the requested maneuver.

Various embodiments include methods implemented in vehicle processing systems and network computing device processing systems for detecting misbehavior in MCMs. In various embodiments, a V2X processing system of a vehicle receiving an MCM may perform a test for misbehavior on the received MCM, and take an action in response to the test identifying misbehavior associated with the MCM. In various embodiments, the V2X processing system may be configured with one or more detectors configured to perform one or more tests for misbehavior on MCMs. The one or more detectors may be configured or implemented in software, hardware, or any combination of software and hardware.

In some embodiments, the V2X processing system may receive an MCM including a first field and a second field, and in response to the first and second fields including inconsistent information the processing system may transmit a message associated with the received MCM that includes an indication that information in the first field is inconsistent with information in the second field. In some embodiments, the V2X processing system may determine whether first information in one or more first fields of a received MCM is inconsistent with second information in one or more second fields of the received MCM, and may determining that a misbehavior condition exists in the received MCM in response to determining that the first information in one or more first fields of the received MCM is inconsistent with the second information in one or more second fields of the received MCM. In some embodiments, in response to determining that the misbehavior condition (for example, in response to a test identifying misbehavior associated with the MCM), the V2X processing system may send a misbehavior report (e.g., an MBR) to a network computing device, such as a Misbehavior Authority server.

In some embodiments, performing a test for misbehavior on the MCM may include determining whether information in a MCM type field is inconsistent with the presence or absence of one or more second fields. For example, the V2X processing system may perform a test to determine an inconsistency between a format of a MCM and a value in one or more fields of the MCM. It some MCMs, the MCM should contain properly configured optional fields consistent with a value in a MCM type field. In some embodiments, the V2X processing system may detect that the MCM is missing a field, and may cancel and/or renegotiate a maneuver with a remote vehicle. In some embodiments, the format of an MCM may be defined in a technical standard, such as the SAE J3186 standard.

In some embodiments, performing a test for misbehavior on the MCM may include determining whether information in a target road resource (TRR) location field is inconsistent with information in a TRR type field. For example, the V2X processing system may perform a test to determine whether a value of a TRR location field is inconsistent with a value of a TRR type field (e.g., the value of the TRR location field and the value of the TRR type field cannot both be true).

In some embodiments, the V2X processing system may determine whether information in two or more fields of the MCM related to a requested or proposed maneuver are inconsistent. In some embodiments, performing a test for misbehavior on the MCM may include determining whether information in an executant ID field is inconsistent with information in a source ID field or information in a destination ID field. (An executant ID indicates an identifier of a vehicle executing or performing a maneuver or sub-maneuver.) For example, the V2X processing system may determine whether a value of a source ID field identifying a sending vehicle and/or a value of a destination ID field identifying a receiving vehicle are consistent with a values of executant ID field(s) that identify a vehicle performing a maneuver or sub-maneuver. For example, correctly formatted and configured MCMs must include identifiers for all maneuvering vehicles within the set for source IDs and destination IDs. In one form of MCM misbehavior, and attacker may not include in an MCM one or more destination IDs that would notify a remote vehicle of a required maneuver or sub-maneuver.

In some embodiments, performing a test for misbehavior on the MCM may include determining whether information in a maximum speed field is inconsistent with a TRR location field. For example, a receiving V2X processing system may determine or calculate a speed required to perform a maneuver or sub-maneuver (either by the sending vehicle or the receiving vehicle) based on the vehicle's start position and time and end position and time. If the maneuvering vehicle requires a speed to complete the proposed maneuver that is greater than a value of the maximum speed indicated in the MCM, the V2X processing system may determine an inconsistency in those values in the MCM.

In some embodiments, the V2X processing system may determine whether information in two or more fields of the MCM related to a requested or proposed maneuver are implausible. For example, the V2X processing system may determine whether a trajectory of a proposed or requested maneuver, or another aspect of the proposal requested maneuver, is plausible or performable prior to the performance of the maneuver. In some embodiments, performing a test for misbehavior on the MCM may include determining whether first information in one or more fields related to an intended maneuver of the vehicle is inconsistent with second information in one or more second fields related to the intended maneuver of the vehicle. For example, the V2X processing system may determine that a value of a minimum speed field in the MCM is greater than a value of a maximum speed field in the MCM. As another example, the V2X processing system may determine that an a value of in executant size field (e.g., width, length, height, etc.) is greater than a value in a TRR field (e.g., indicating a with, length, height, etc. of the TRR).

In some embodiments, the V2X processing system may determine that first information in one or more fields related to an intended maneuver of the vehicle or the second information in one or more second fields related to the intended maneuver of the vehicle exceeds a threshold. In some embodiments, the V2X processing system may be configured with one or more thresholds for TRR parameters, vehicle performance and/or operational parameters, and the like. For example, the V2X processing system may be configured with a TRR width threshold, which may indicate a maximum road lane width. The V2X processing system may determine that a value of a TRR width field in the MCM is greater than the TRR width threshold, which may indicate an inconsistency in the MCM.

In some embodiments, the V2X processing system may determine that the first information in one or more fields related to an intended maneuver of the vehicle or the second information in one or more second fields related to the intended maneuver of the vehicle indicate an overlap of a TRR. For example, the V2X processing system may compare information in a first MCM and information in a second MCM, and may determine an inconsistency that includes an overlap of one or more parameters of a TRR in the first information and the second information. As another example, the V2X processing system may receive a first MCM from a first remote vehicle and a second MCM from a second remote vehicle, and may determine an overlap in a TRR parameter in first information of the first MCM, and in second information of the second MCM. In some embodiments, an overlap of a TRR parameter may indicate a possible road accident, such as a possible collision between two vehicles.

In some embodiments, the V2X processing system may identify or determine an inconsistency between an MCM and requirements of the applicable communication protocol (e.g., MSCS). For example, the V2X processing system may receive two MCMs (a first MCM and a second MCM) from a sending vehicle. The V2X processing system may perform a test for misbehavior on the first or second MCM that includes determining whether first information in the first MCM is inconsistent with second information in the MCM. The V2X processing system may identify a misbehavior condition in response to determining that the first information in the first MCM is inconsistent with the second information in the second MCM.

In some embodiments, the V2X processing system may determine that the first MCM and the second MCM are out of and expected or proper sequence. For example, the V2X processing system may determine that the first MCM includes a maneuver cancellation (MCM type 5) canceling a proposed maneuver, and the second MCM includes a maneuver reservation (MCM type 3) or an emergency maneuver reservation (MCM type 6) indicating that the sending vehicle requests or proposes a maneuver. According to the requirements of the applicable communication protocol, the maneuver cancellation MCM and the maneuver reservation MCM may be out of sequence. In such embodiments, the V2X processing system may determine whether the first MCM and the second MCM are out of sequence, indicating an inconsistency in the first and/or second MCM.

In some embodiments, the V2X processing system may identify MCM misbehavior in which an attacker engages in uncooperative behavior, such as repeatedly denying maneuver requests, or proposing maneuvers or sub-maneuvers that force a victim vehicle to alter or cancel maneuvers. In some embodiments, performing a test for misbehavior on the MCM may include determining a quantity of maneuver request denials received from a remote vehicle associated with one or more requests to perform a maneuver sent by the vehicle to the remote vehicle, and identifying a misbehavior condition in response to determining that the quantity of maneuver request denials meets a request denial threshold. For example, the V2X processing system may determine that a remote vehicle refuses or denies a requested maneuver multiple times. When the V2X processing system determines that the number of refusals or denials meets a request denial threshold, the V2X processing system may identify a misbehavior condition.

In some embodiments, the V2X processing system may identify a failure to respond within a period of time as a request denial. For example, the V2X processing system may start a timer associated with the one or more requests to perform a maneuver sent to the remote vehicle. The V2 expressing system may count a maneuvering request denial upon expiration of the timer without receiving a response from the remote vehicle to the one or more requests. In response to determining that the number of refusals or denials meets the request denial threshold, the V2X processing system may identify a misbehavior condition.

In some embodiments, the V2X processing system also may consider whether the remote vehicle is capable of responding to the sending vehicle's requests, and/or whether the remote vehicle is able to perform an operation (such as a maneuver or sub-maneuver) related to the sending vehicle's requests. For example, the V2X processing system may determine whether wireless communication link conditions permit or prevent V2X communication. For example, the V2X processing system may determine that wireless communication link interference, message or signal congestion, or another factor is interfering with V2X communication with the remote vehicle.

As another example, the V2X processing system may determine whether the remote vehicle is within communication range, such as based on information in another V2X message (such as a BSM or CAM), or based on information from one or more sensors of the vehicle (for example, information from a camera, radar, lidar, and/or the like). As another example, the V2X processing system may determine whether the road environment permits or prevents completion or performance of a maneuver (for example, based on information in another V2X message, information from vehicle sensors, information from a digital map such as a High Definition map, and/or the like).

In some embodiments, the V2X processing system may identify a misbehavior condition in response to determining that the remote vehicle is able to respond to the one or more requests to perform the maneuver, and that the remote vehicle is able to perform the operation related to the one or more requests perform the maneuver.

Various embodiments include methods and network computing device processing systems for misbehavior detection in an MCM. In some embodiments, and network computing device processing system may receive a plurality of misbehavior reports indicating MCM misbehavior from a plurality of vehicles, and may identify an inconsistency among the plurality of misbehavior reports. The network computing device processing system may identify a misbehavior condition in response to identifying the inconsistency among the plurality of misbehavior reports, and may take an action in response to identifying the misbehavior condition. In some embodiments, identifying the inconsistency among the plurality of misbehavior reports may include determining that the vehicle is impersonating multiple vehicles. In some embodiments, identifying the inconsistency among the plurality of misbehavior reports may include determining that a vehicle identified in the plurality of misbehavior reports has not sent a misbehavior report to the network computing device. In some embodiments, the network computing device processing system may send to a second network computing device a request for information related to the identified inconsistency among the plurality of misbehavior reports.

For example, the network computing device may receive one or more misbehavior reports from one or more vehicles indicating that the vehicle(s) have identified or determined MCM misbehavior. Typically such misbehavior reports may include a reason code identifying a misbehavior condition or misbehavior attack. Such misbehavior reports also may include vehicle identifiers such as source IDs, destination IDs, executant IDs, and/or the like. Using such information the network computing device may identify each vehicle involved in a maneuver and/or MCMs related to a maneuver.

In some embodiments, the network computing device may determine that one or more involved vehicles have failed to transmit a misbehavior report. In some embodiments, the network computing device may determine that there is an inconsistency between or among misbehavior reports. For example, the network computing device may identify inconsistent attack types among misbehavior reports. As another example, the network computing device may determine that different misbehavior reports identify different attackers. The network computing device may identify a misbehavior condition in response to identifying the inconsistency among the plurality of misbehavior reports.

In some embodiments, the network computing device may send a request for information to another network computing device, such as a vehicle manufacturer or fleet operator, to notify them of a malfunctioning device in the attacker vehicle. In some embodiments, the network computing device may request information from a Linkage Authority or another suitable network computing device to request information about whether reported vehicle identifiers (e.g., source ID, destination ID, executant ID, etc.) are associated with or linked to the same vehicle. The network computing device may use information about vehicle identifiers received in response to such requests to determine whether an attacker vehicle is impersonating one or more other vehicles, or sending MCMs purporting to be from remote vehicles other than the attacker vehicle. In response to identifying a misbehavior condition, the network computing device may take an action against an attacker vehicle, such as revoking a digital certificate of a determined attacker vehicle to deny the attacker access to the V2X communication network.

Various embodiments, may enable V2X processing systems in vehicles and network device processing systems to detect and respond to attacks introducing MCM misbehaviors. In one example attack scenario, a receiving vehicle may receive one or more MCMs from a sending vehicle, and the receiving vehicle may determine or identify MCM misbehavior in the received MCMs. The received MCMs may be associated with a specific maneuver ID. The receiving vehicle may send MCMs to other vehicles indicating the detected MCM misbehavior. The MCMs sent to other vehicles also may include the specific maneuver ID from the sending vehicle, an identifier of the sending vehicle, a Reason Code indicating a detected erroneous behavior (Reason Code 3), and/or other information. The receiving vehicle also may send a misbehavior report to a Misbehavior Authority computing device in the V2X communication network. Further, the other vehicles to which the receiving vehicle reported the detected MCM misbehavior also may send misbehavior reports to the Misbehavior Authority network computing device. The multiple misbehavior reports may enable the Misbehavior Authority network computing device to identify the attacker vehicle and the type of attack being employed.

In another example attack scenario, an attacker vehicle may send an MCM canceling a maneuver negotiation or denying a maneuver requested by another vehicle. As a justification for the cancellation or denial, the MCM from the attacker vehicle may include a Response Code falsely indicating that the attacker vehicle has detected MCM misbehavior, for example, from the sending vehicle, or from another (a third) vehicle. Because the attacker vehicle has broadcast the MCM including the response code falsely indicating a detected MCM misbehavior, other nearby vehicles may send a misbehavior report to a Misbehavior Authority reporting the (false) detected MCM misbehavior. However, the misbehavior reports from the other nearby vehicles may identify the attacker vehicle as the sender of the initial report of MCM misbehavior. Accordingly, the Misbehavior Authority may expect the attacker vehicle will also to send a misbehavior report. However, in response to the attacker vehicle not sending a misbehavior report to the Misbehavior Authority, the Misbehavior Authority may identify the attacker vehicle as true source of the MCM misbehavior. The Misbehavior Authority also may take a remedial action against the identified attacker vehicle.

Various embodiments improve the security and operation of V2X processing systems in vehicles by enabling V2X processing systems in vehicles and network computing device processing systems to identify and take appropriate action in response to misbehavior in MCMs. Various embodiments improve the security of V2X networks and communication systems by enabling V2X processing systems in vehicles and network computing device processing systems to protect the integrity of MCMs. Various embodiments improve the security and operation of V2X networks and communication systems by enabling V2X processing systems in vehicles and network computing device processing systems to reduce or eliminate disruptions to network communication and road traffic that may be caused by MCM misbehavior.

FIG. 1A is a system block diagram illustrating an example communication system 100 suitable for implementing the various embodiments. The communications system 100 include a 5G New Radio (NR) network, an ITS V2X wireless network, and/or any other suitable network such as a Long Term Evolution (LTE) network. References to a 5G network and 5G network elements in the following descriptions are for illustrative purposes and are not intended to be limiting.

The communications system 100 may include a heterogeneous network architecture that includes a core network 140, a number of base stations 110, and a variety of mobile devices including a vehicle 102 equipped with a V2X processing system 104 that includes wireless communication capabilities. The base station 110 may communicate with a core network 140 over a wired communication link 126. The communications system 100 also may include roadside units 112 supporting V2X communications with vehicles 102 via V2X wireless communication links 124.

A base station 110 is a network element that communicates with wireless devices (e.g., a V2X processing system 104 of the vehicle 102) via a wireless communication link 122, and may be referred to as a Node B, an LTE Evolved nodeB (eNodeB or eNB), an access point (AP), a radio head, a transmit receive point (TRP), a New Radio base station (NR BS), a 5G NodeB (NB), a Next Generation NodeB (gNodeB or gNB), or the like. Each base station 110 may provide communication coverage for a particular geographic area or "cell." In 3GPP, the term "cell" can refers to a coverage area of a base station, a base station subsystem serving this coverage area, or a combination thereof, depending on the context in which the term is used. The core network 140 may be any type of core network, such as an LTE core network (e.g., an evolved packet core (EPC) network), 5G core network, a disaggregated network as described with reference to FIG. 1B, etc.

Roadside units 112 may communicate with the core network 140 via a wired or wireless communication link 128. Roadside units 112 may communicate via V2X wireless communication links 124 with V2X processing system-equipped vehicles 102 for downloading information useful for V2X processing system autonomous and semi-autonomous driving functions, and for receiving information such as misbehavior reports from the V2X processing system 104.

A Misbehavior Authority network computing device (MA) 132 may communicate with the core network 140 via a wired or wireless communication link 127. The MA 132 may receive misbehavior reports from the V2X processing system 104 as may be sent by the V2X processing system 104 from time to time.

Wireless communication links 122 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Figure 1B:
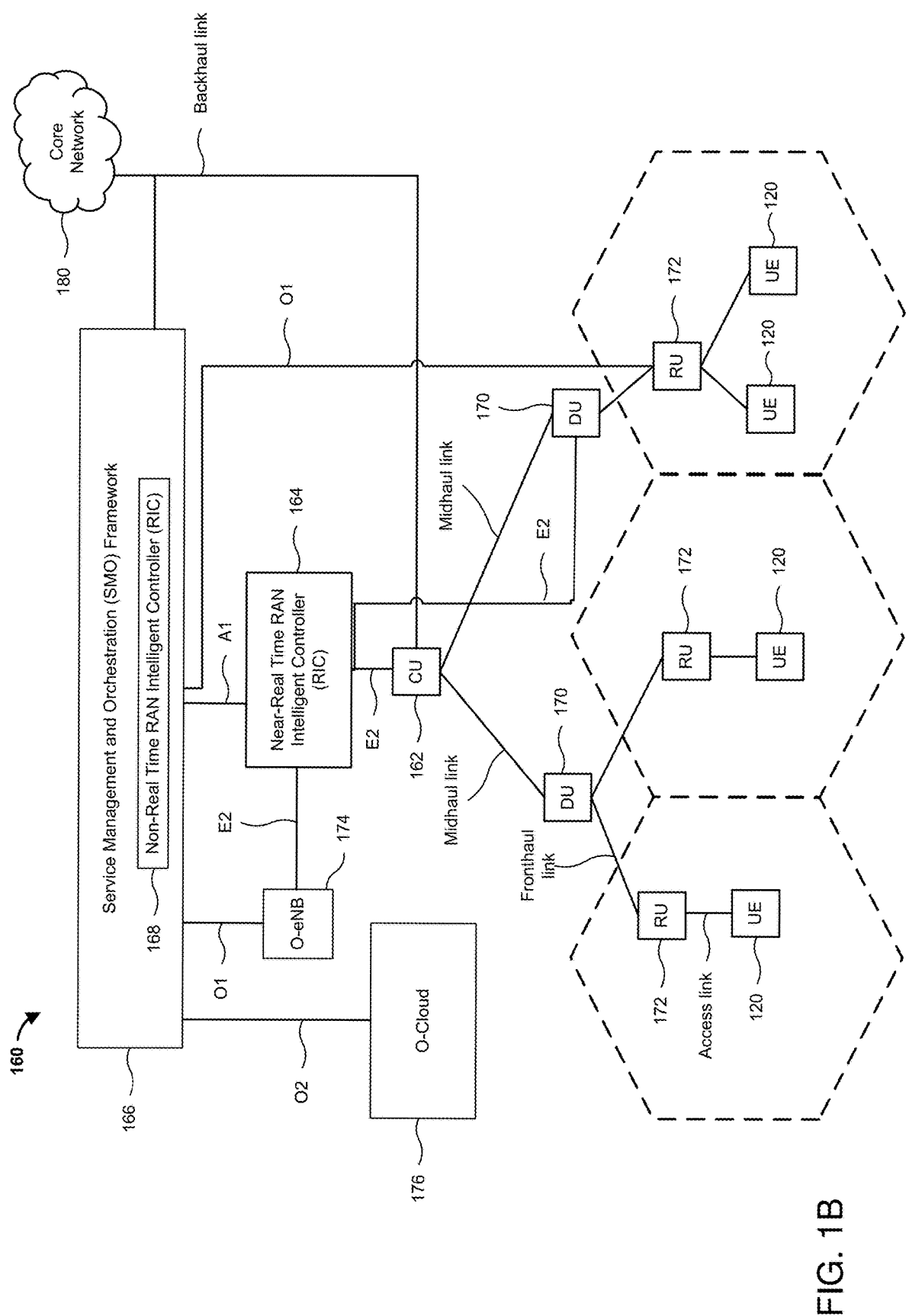
FIG. 1B is a system block diagram illustrating an example disaggregated base station architecture suitable for implementing various embodiments.

FIG. 1B is a system block diagram illustrating an example disaggregated base station 160 architecture that may be part of a V2X and/or 5G network suitable for communicating map data to vehicles and communicating updated object/feature location data according to any of the various embodiments. With reference to FIGS. 1A and 1B, the disaggregated base station 160 architecture may include one or more central units (CUs) 162 that can communicate directly with a core network 180 via a backhaul link, or indirectly with the core network 180 through one or more disaggregated base station units, such as a Near-Real Time (Near-RT) RAN Intelligent Controller (RIC) 164 via an E2 link, or a Non-Real Time (Non-RT) RIC 168 associated with a Service Management and Orchestration (SMO) Framework 166, or both. A CU 162 may communicate with one or more distributed units (DUs) 170 via respective midhaul links, such as an F1 interface. The DUs 170 may communicate with one or more radio units (RUs) 172 via respective fronthaul links. The RUs 172 may communicate with respective UEs 120 via one or more radio frequency (RF) access links. In some implementations, user equipment (UE), such as a V2X processing system 104, may be simultaneously served by multiple RUs 172.

Each of the units (i.e., CUs 162, DUs 170, RUs 172), as well as the Near-RT RICs 164, the Non-RT RICs 168 and the SMO Framework 166, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 162 may host one or more higher layer control functions. Such control functions may include the radio resource control (RRC), packet data convergence protocol (PDCP), service data adaptation protocol (SDAP), or the like. Each control function may be implemented with an interface configured to communicate signals with other control functions hosted by the CU 162. The CU 162 may be configured to handle user plane functionality (i.e., Central Unit-User Plane (CU-UP)), control plane functionality (i.e., Central Unit-Control Plane (CU-CP)), or a combination thereof. In some implementations, the CU 162 can be logically split into one or more CU-UP units and one or more CU-CP units. The CU-UP unit can communicate bidirectionally with the CU-CP unit via an interface, such as the E1 interface when implemented in an O-RAN configuration. The CU 162 can be implemented to communicate with DUs 170, as necessary, for network control and signaling.

The DU 170 may correspond to a logical unit that includes one or more base station functions to control the operation of one or more RUs 172. In some aspects, the DU 170 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 170 may further host one or more low PHY layers. Each layer (or module) may be implemented with an interface configured to communicate signals with other layers (and modules) hosted by the DU 170, or with the control functions hosted by the CU 162.

Lower-layer functionality may be implemented by one or more RUs 172. In some deployments, an RU 172, controlled by a DU 170, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 172 may be implemented to handle over the air (OTA) communication with one or more UEs 120. In some implementations, real-time and non-real-time aspects of control and user plane communication with the RU(s) 172 may be controlled by the corresponding DU 170. In some scenarios, this configuration may enable the DU(s) 170 and the CU 162 to be implemented in a cloud-based radio access network (RAN) architecture, such as a vRAN architecture.

The SMO Framework 166 may be configured to support RAN deployment and provisioning of non-virtualized and virtualized network elements. For non-virtualized network elements, the SMO Framework 166 may be configured to support the deployment of dedicated physical resources for RAN coverage requirements, which may be managed via an operations and maintenance interface (such as an O1 interface). For virtualized network elements, the SMO Framework 166 may be configured to interact with a cloud computing platform (such as an open cloud (O-Cloud) 176) to perform network element life cycle management (such as to instantiate virtualized network elements) via a cloud computing platform interface (such as an O2 interface). Such virtualized network elements can include, but are not limited to, CUs 162, DUs 170, RUs 172 and Near-RT RICs 164. In some implementations, the SMO Framework 166 may communicate with a hardware aspect of a 4G RAN, such as an open eNB (O-eNB) 174, via an O1 interface. Additionally, in some implementations, the SMO Framework 166 may communicate directly with one or more RUs 172 via an O1 interface. The SMO Framework 166 also may include a Non-RT RIC 168 configured to support functionality of the SMO Framework 166.

The Non-RT RIC 168 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 164. The Non-RT RIC 168 may be coupled to or communicate with (such as via an A1 interface) the Near-RT RIC 164. The Near-RT RIC 164 may be configured to include a logical function that enables near-real-time control and optimization of RAN elements and resources via data collection and actions over an interface (such as via an E2 interface) connecting one or more CUs 162, one or more DUs 170, or both, as well as an O-eNB, with the Near-RT RIC 164.

In some implementations, to generate AI/ML models to be deployed in the Near-RT RIC 164, the Non-RT RIC 168 may receive parameters or external enrichment information from external servers. Such information may be utilized by the Near-RT RIC 164 and may be received at the SMO Framework 166 or the Non-RT RIC 168 from non-network data sources or from network functions. In some examples, the Non-RT RIC 168 or the Near-RT RIC 164 may be configured to tune RAN behavior or performance. For example, the Non-RT RIC 168 may monitor long-term trends and patterns for performance and employ AI/ML models to perform corrective actions through the SMO Framework 166 (such as reconfiguration via O1) or via creation of RAN management policies (such as A1 policies).

Figure 1C:
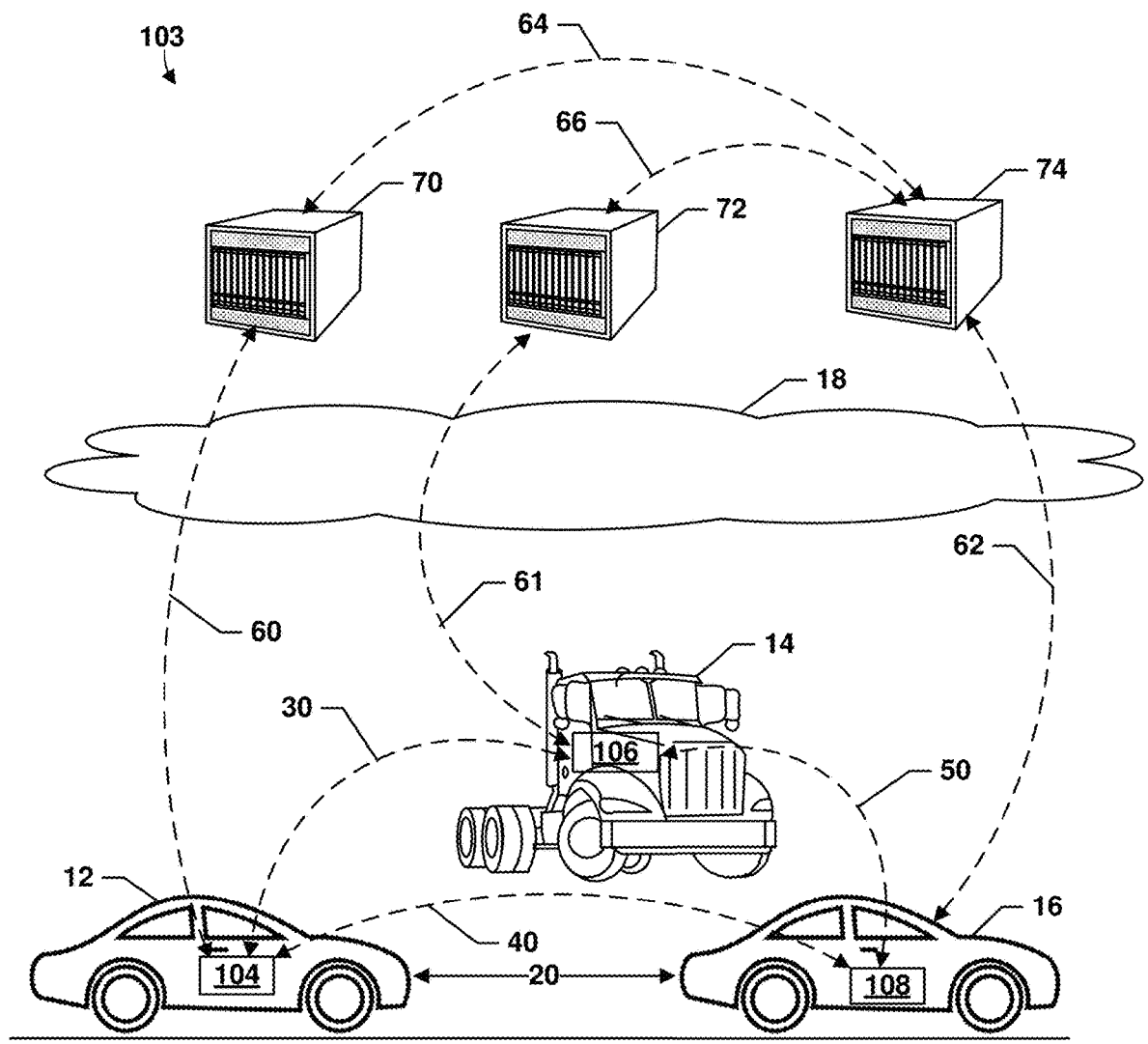
FIG. 1C is a system block diagram illustrating a communication system suitable for implementing various embodiments.

FIG. 1C is a system block diagram illustrating a communication system 103 suitable for implementing various embodiments. With reference to FIGS. 1A-1C, the communication system 103 may include three vehicles 12, 14, 16. Each vehicle 12, 14, 16 may include a V2X processing system 104, 106, 108, respectively, each configured to periodically broadcast V2X messages such as Basic Safety Messages 30, 40, 50 for receipt and processing by other vehicles' V2X processing systems (e.g., 104, 106, 108). By sharing the vehicle location, speed, direction, braking, and other information, vehicles can maintain safe separation and identify and avoid potential collisions. For example, a trailing vehicle 12 receiving Basic Safety Messages 40 from a leading vehicle 16 can determine the speed and location of the vehicle 16, which in turn enables vehicle 12 to match the speed and maintain a safe separation distance 20. By being informed through Basic Safety Messages 40 when the leading vehicles 16 applies the brakes, the V2X processing system 102 in the trailing vehicle 12 can apply brakes simultaneously to maintain the safe separation distance 20 even when the leading vehicle 16 stops suddenly. As another example, the V2X processing system 104 within the truck vehicle 14 may receive Basic Safety Messages 30, from the two vehicles 12, 16, and thus be informed that the truck vehicle 14 should stop at the intersection to avoid a collision. Each of the vehicle V2X on-board equipment 104, 106, 108 may communicate with one another using any of a variety close proximity communication protocols. In addition, the vehicles may be able to transmit data and information regarding detected Basic Safety Messages as well as a misbehavior report about detected V2X misbehavior to an original equipment manufacturer (OEM) (70, 72) and/or MA 74 (e.g., 132) via communication links 60, 61, 62 through a communication network 18. The misbehavior report may be transmitted directly to the MA 74 (e.g., via communication link 64, 66). In other embodiments, the misbehavior report may first be transmitted to a misbehavior report pre-processing unit such as the OEM servers 70, 72 for pre-processing through communication links 64, 66. Then the pre-processed misbehavior report may be transmitted from the misbehavior report pre-processing servers 70, 72 to the MA 74 through communication links 64, 66. In other embodiments, a misbehavior report may be received from a vehicle, such as from vehicle 16, at the MA 74. The MA 74 may relay the received misbehavior report from the vehicle 16 onto OEM servers 70, 72 via communication links 64, 66. In addition, the OEM servers 70, 72 may provide confirmation reports to the MA 74 via communication links 64, 66.

Figure 2A:
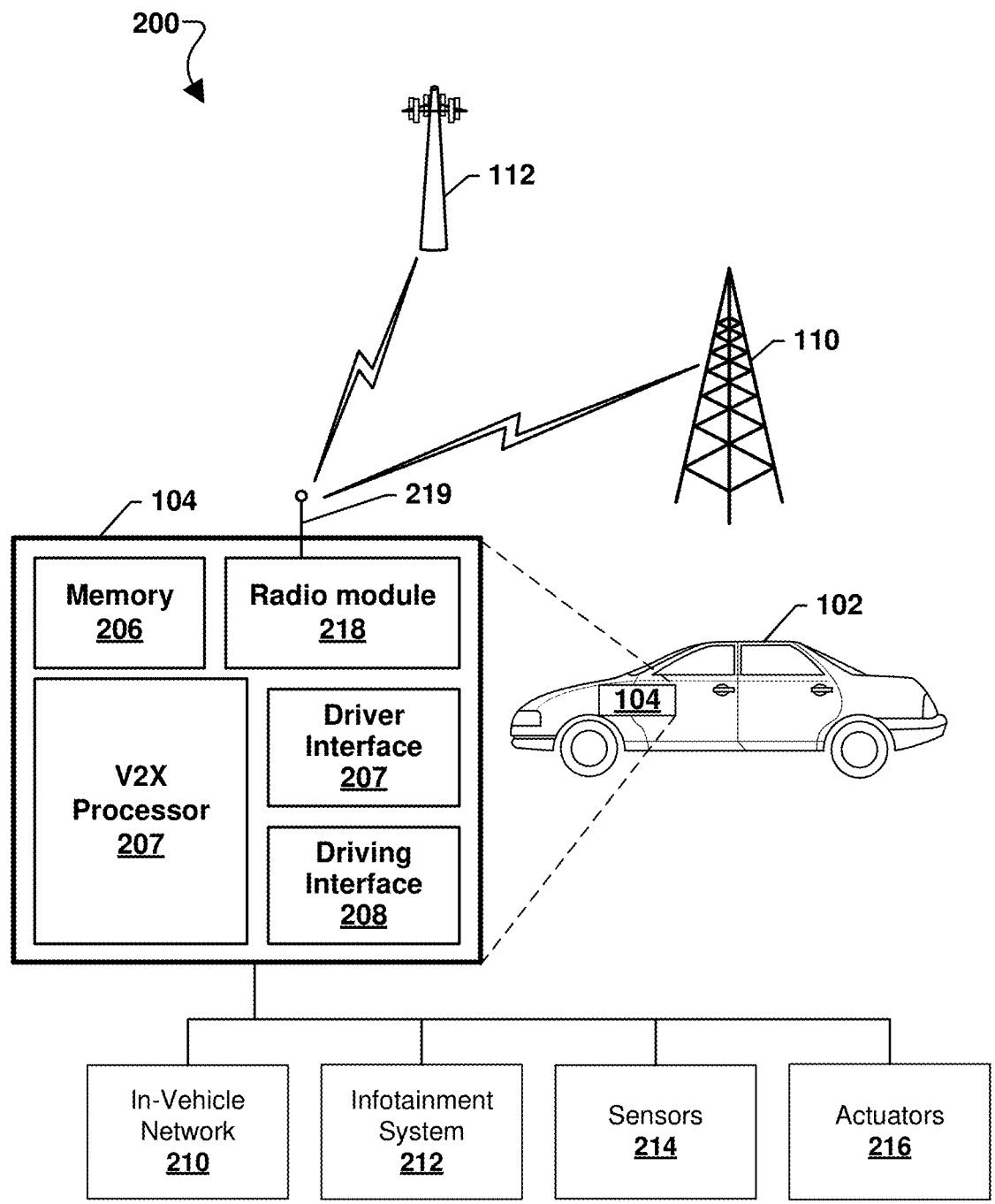
FIG. 2A is a component diagram of an example vehicle V2X processing system suitable for implementing various embodiments.

FIG. 2A is a component diagram of an example vehicle V2X processing system 200 including a suitable for implementing various embodiments. With reference to FIGS. 1A-2A, the processing system 200 may include a vehicle 102 that includes a V2X processing system 104. The vehicle V2X processing system 104 may communicate with various systems and devices, such as an in-vehicle network 210, an infotainment system 212, various sensors 214, various actuators 216, and a radio module 218 coupled to an antenna 219. The vehicle V2X processing system 104 also may communicate with roadside units 112, cellular communication network base stations 110, and other external devices.

The V2X processing system 104 may include a processor 205, memory 206, an input module 207, an output module 208 and the radio module 218. The processor 205 may be coupled to the memory 206 (i.e., a non-transitory storage medium), and may be configured with processor-executable instructions stored in the memory 206 to perform operations of the methods according to various embodiments described herein. Also, the processor 205 may be coupled to the output module 208, which may control in-vehicle displays, and to the input module 207 to receive information from vehicle sensors as well as driver inputs.

The V2X processing system 104 may include a V2X antenna 219 coupled to the radio module 218 that is configured to communicate with one or more ITS participants (e.g., stations), a roadside unit 112, and a base station 110 or another suitable network access point. The V2X antenna 219 and radio module 218 may be configured to receive dynamic traffic flow feature information via vehicle-to-everything (V2X) communications. In various embodiments, the V2X processing system may receive information from a plurality of information sources, such as the in-vehicle network 210, infotainment system 212, various sensors 214, various actuators 216, and the radio module 218. The V2X processing system may be configured to perform autonomous or semi-autonomous driving functions using map data in addition to sensor data, as further described below.

Examples of an in-vehicle network 210 include a Controller Area Network (CAN), a Local Interconnect Network (LIN), a network using the FlexRay protocol, a Media Oriented Systems Transport (MOST) network, and an Automotive Ethernet network. Examples of vehicle sensors 214 include a location determining system (such as a Global Navigation Satellite Systems (GNSS) system, a camera, radar, lidar, ultrasonic sensors, infrared sensors, and other suitable sensor devices and systems. Examples of vehicle actuators 216 include various physical control systems such as for steering, brakes, engine operation, lights, directional signals, and the like.

Figure 2B:
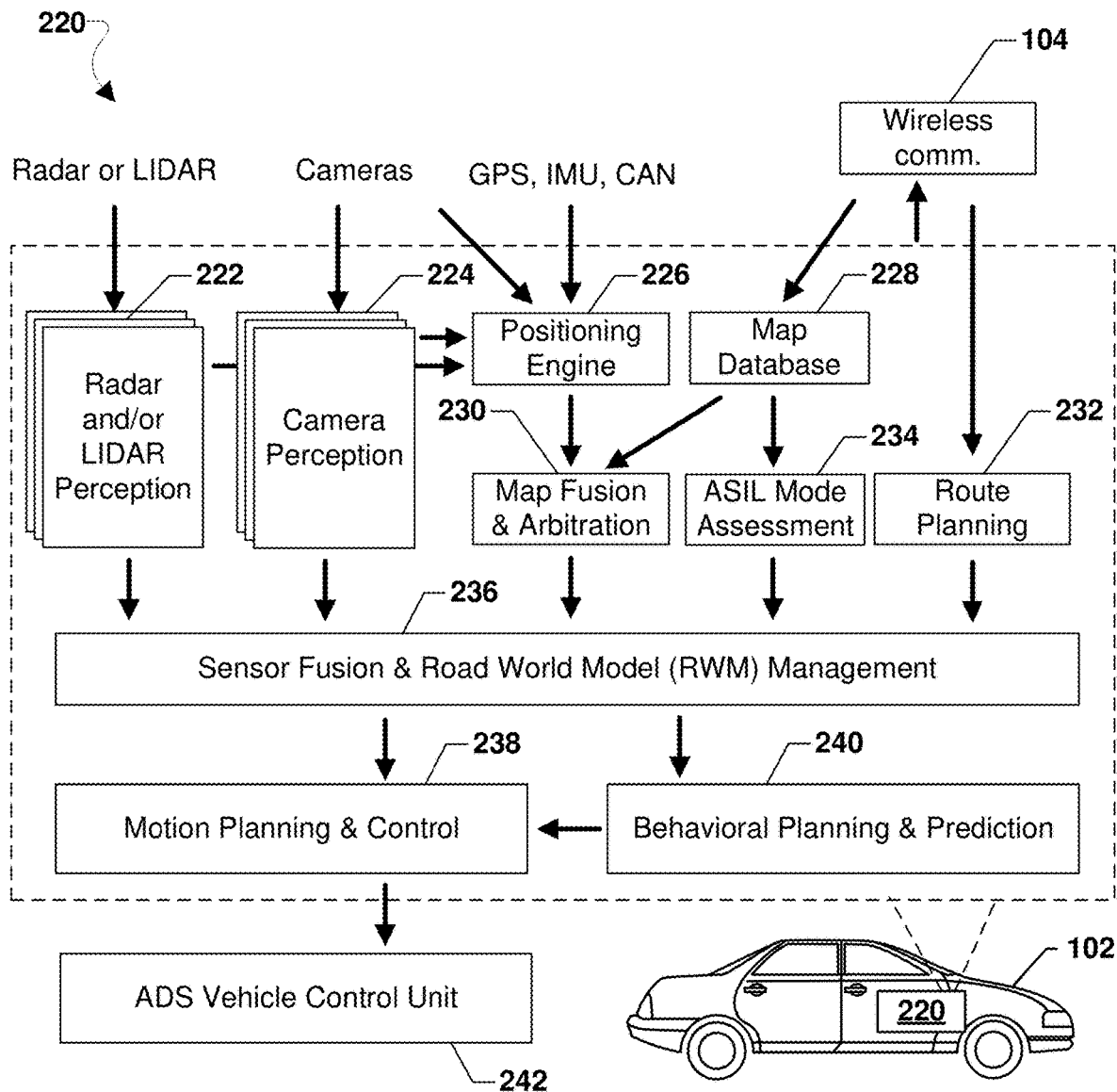
FIG. 2B is a component block diagram illustrating components of an example vehicle autonomous/semiautonomous driving system suitable for implementing various embodiments.

FIG. 2B is a component block diagram illustrating components of an example vehicle autonomous/semiautonomous driving system 220, which may be coupled to the V2X processing system 104 and suitable for implementing various embodiments. The autonomous/semiautonomous driving system 220 may include various subsystems, communication elements, computational elements, computing devices or units which may be utilized within a vehicle 102. With reference to FIGS. 1A-2A, the various computational elements, computing devices or units within the autonomous/semiautonomous driving system 220 may be implemented within a system of computing devices (i.e., subsystems) that communicate data and commands to each other via the in-vehicle network 210 (e.g., indicated by the arrows in FIG. 2B). In some implementations, the various computational elements, computing devices or units within the autonomous/semiautonomous driving system 220 may be implemented within a single computing device, such as separate threads, processes, algorithms or computational elements. Therefore, each subsystem/computational element illustrated in FIG. 2B is also generally referred to herein as a "layer" within a computational "stack" that constitutes the vehicle autonomous/semiautonomous driving system 220. However, the use of the terms layer and stack in describing various embodiments are not intended to imply or require that the corresponding functionality is implemented within a single vehicle computing device, although that is a potential implementation embodiment. Rather the use of the term "layer" is intended to encompass subsystems with independent processors, computational elements (e.g., threads, algorithms, subroutines, etc.) running in one or more computing devices, and combinations of subsystems and computational elements.

The autonomous/semiautonomous driving system 220 may include a radar and/or lidar perception layer 222, a camera perception layer 224, a positioning engine layer 226, a map database 228, a map fusion and arbitration layer 230, a route planning layer 232, an operating mode assessment layer 234, a sensor fusion and road world model (RWM) management layer 236, a motion planning and control layer 238, and a behavioral planning and prediction layer 240. The layers 222-240 are merely examples of some layers in one example configuration of the autonomous/semiautonomous driving system 220. In other configurations, other layers may be included, such as additional layers for other perception sensors (e.g., a lidar perception layer, etc.), additional layers for planning and/or control, additional layers for modeling, etc., and/or certain of the layers 222-240 may be excluded from the autonomous/semiautonomous driving system 220. Each of the layers 222-240 may exchange data, computational results and commands as illustrated by the arrows in FIG. 2B. Further, the autonomous/semiautonomous driving system 220 may receive and process data from sensors (e.g., radar, lidar, cameras, inertial measurement units (IMU) etc.), navigation information sources (e.g., Global Positioning System (GPS) receivers, IMUs, etc.), vehicle networks (e.g., Controller Area Network (CAN) bus), and databases in memory (e.g., digital map data). The autonomous/semiautonomous driving system 220 may output vehicle control commands or signals to an autonomous driving system (ADS) vehicle control unit 242, which is a system, subsystem or computing device that interfaces directly with vehicle steering, throttle and brake controls. The configuration of the autonomous/semiautonomous driving system 220 and ADS vehicle control unit 242 illustrated in FIG. 2A is merely an example configuration and other configurations of a vehicle management system and other vehicle components may be used. As an example, the configuration of the autonomous/semiautonomous driving system 220 and ADS vehicle control unit 242 illustrated in FIG. 2B may be used in a vehicle configured for autonomous or semi-autonomous operation while a different configuration may be used in a non-autonomous vehicle.

The radar and/or lidar perception layer 222 may receive data from one or more detection and ranging sensors, such as radar (e.g., 132) and/or lidar (e.g., 138), and process the data to recognize and determine locations of other vehicles and objects within a vicinity of the vehicle 100. The radar perception layer 222 may include use of neural network processing and artificial intelligence methods to recognize objects and vehicles, and pass such information on to the sensor fusion and RWM management layer 236.

The camera perception layer 224 may receive data from one or more cameras, such as cameras, and process the data to recognize and determine locations of other vehicles and objects within a vicinity of the vehicle 100. The camera perception layer 224 may include use of neural network processing and artificial intelligence methods to recognize objects and vehicles, and pass such information on to the sensor fusion and RWM management layer 236.

The positioning engine layer 226 may receive data from the radar and/or lidar perception layer 222, the camera perception layer 224, and various sources of navigation information, and process the data and information to determine a position of the vehicle 100. Various sources of navigation information may include, but is not limited to, a GPS receiver, an IMU, and/or other sources and sensors connected via a CAN bus. The positioning engine layer 226 may also utilize inputs from one or more cameras, such as cameras and/or any other available sensor capable of identifying and determining directions and distances to objects in the vicinity of the vehicle, such as radars, lidars, etc.

The autonomous/semiautonomous driving system 220 may include or be coupled to a vehicle V2X processing system 104 according to various embodiments. One or more of the layers 222-240 may provide information to or receive information from the V2X processing system 104. The V2X processing system 104 may be configured to communicate with highway communication systems, such as via V2X communication links (e.g., 124) and/or to remote information sources (e.g., computing device 132) via cellular wireless communication links (e.g., 122), such as via 5G cellular networks.

The map fusion and arbitration layer 230 may access the map database 228 for location information regarding nearby objects and features, and receive localizing/navigation information output from the positioning engine layer 226, and process the data to further determine the position of the vehicle 102 within the map, such as location within a lane of traffic, position within a street map, etc. sensor data may be stored in a memory (e.g., memory 312).

Similar to location information in some map objects and features and sensor accuracy and precision, GPS position fixes include some error, so the map fusion and arbitration layer 230 may function to determine a best guess location of the vehicle within a roadway based upon an arbitration between the GPS coordinates, sensor data, and map data regarding objects and features in and near the roadway. For example, while GPS coordinates may place the vehicle near the middle of a two-lane road in the sensor data, the map fusion and arbitration layer 230 may determine from the direction of travel that the vehicle is most likely aligned with the travel lane consistent with the direction of travel. The map fusion and arbitration layer 230 may pass arbitrated map location information to the sensor fusion and RWM management layer 236.

The route planning layer 232 may utilize sensor data, as well as inputs from an operator or dispatcher to plan a route to be followed by the vehicle 102 to a particular destination. The route planning layer 232 may pass map-based location information to the sensor fusion and RWM management layer 236. However, the use of a prior map by other layers, such as the sensor fusion and RWM management layer 236, etc., is not required. For example, other stacks may operate and/or control the vehicle based on perceptual data alone without a provided map, constructing lanes, boundaries, and the notion of a local map as perceptual data is received.

In embodiments including an operating mode assessment layer 234, that processing layer may use safety and/or confidence information regarding nearby objects and features to select an appropriate ADS driving mode. In some embodiments, the operating mode assessment layer 234 may determine whether the current autonomous or semi-autonomous driving mode is consistent with or appropriate in view of safety and/or confidence information regarding nearby objects and features in the driving environment.

The sensor fusion and RWM management layer 236 may receive data and outputs produced by the radar and/or lidar perception layer 222, camera perception layer 224, map fusion and arbitration layer 230, route planning layer 232, and the operating mode assessment layer 234, and use some or all of such inputs to estimate or refine the location and state of the vehicle 102 in relation to the road, other vehicles on the road, and other objects within a vicinity of the vehicle 100. For example, the sensor fusion and RWM management layer 236 may combine imagery data from the camera perception layer 224 with arbitrated map location information from the map fusion and arbitration layer 230 to refine the determined position of the vehicle within a lane of traffic. As another example, the sensor fusion and RWM management layer 236 may combine object recognition and imagery data from the camera perception layer 224 with object detection and ranging data from the radar and/or lidar perception layer 222 to determine and refine the relative position of other vehicles and objects in the vicinity of the vehicle. As another example, the sensor fusion and RWM management layer 236 may receive information from V2X communications (such as via the CAN bus) regarding other vehicle positions and directions of travel, and combine that information with information from the radar and/or lidar perception layer 222 and the camera perception layer 224 to refine the locations and motions of other vehicles. The sensor fusion and RWM management layer 236 may output refined location and state information of the vehicle 100, as well as refined location and state information of other vehicles and objects in the vicinity of the vehicle, to the motion planning and control layer 238 and/or the behavior planning and prediction layer 240.

As a further example, the sensor fusion and RWM management layer 236 may use dynamic traffic control instructions directing the vehicle 102 to change speed, lane, direction of travel, or other navigational element(s), and combine that information with other received information to determine refined location and state information. The sensor fusion and RWM management layer 236 may output the refined location and state information of the vehicle 102, as well as refined location and state information of other vehicles and objects in the vicinity of the vehicle 100, to the motion planning and control layer 238, the behavior planning and prediction layer 240 and/or devices remote from the vehicle 102, such as a data server, other vehicles, etc., via wireless communications, such as through C-V2X connections, other wireless connections, etc.

As a still further example, the sensor fusion and RWM management layer 236 may monitor perception data from various sensors, such as perception data from a radar and/or lidar perception layer 222, camera perception layer 224, other perception layer, etc., and/or data from one or more sensors themselves to analyze conditions in the vehicle sensor data. The sensor fusion and RWM management layer 236 may be configured to detect conditions in the sensor data, such as sensor measurements being at, above, or below a threshold, certain types of sensor measurements occurring, etc., and may output the sensor data as part of the refined location and state information of the vehicle 102 provided to the behavior planning and prediction layer 240 and/or devices remote from the vehicle 100, such as a data server, other vehicles, etc., via wireless communications, such as through C-V2X connections, other wireless connections, etc.

The behavioral planning and prediction layer 240 of the autonomous vehicle V2X processing system 220 may use the refined location and state information of the vehicle 102 and location and state information of other vehicles and objects output from the sensor fusion and RWM management layer 236 to predict future behaviors of other vehicles and/or objects. For example, the behavioral planning and prediction layer 240 may use such information to predict future relative positions of other vehicles in the vicinity of the vehicle based on own vehicle position and velocity and other vehicle positions and velocity. Such predictions may take into account information from the map data and route planning to anticipate changes in relative vehicle positions as host and other vehicles follow the roadway. The behavioral planning and prediction layer 240 may output other vehicle and object behavior and location predictions to the motion planning and control layer 238. Additionally, the behavior planning and prediction layer 240 may use object behavior in combination with location predictions to plan and generate control signals for controlling the motion of the vehicle 102. For example, based on route planning information, refined location in the roadway information, and relative locations and motions of other vehicles, the behavior planning and prediction layer 240 may determine that the vehicle 102 needs to change lanes and accelerate, such as to maintain or achieve minimum spacing from other vehicles, and/or prepare for a turn or exit. As a result, the behavior planning and prediction layer 240 may calculate or otherwise determine a steering angle for the wheels and a change to the throttle setting to be commanded to the motion planning and control layer 238 and ADS vehicle control unit 242 along with such various parameters necessary to effectuate such a lane change and acceleration. One such parameter may be a computed steering wheel command angle.

The motion planning and control layer 238 may receive data and information outputs from the sensor fusion and RWM management layer 236, map data from the map database 232, and other vehicle and object behavior as well as location predictions from the behavior planning and prediction layer 240, and use this information to plan and generate control signals for controlling the motion of the vehicle 102 and to verify that such control signals meet safety requirements for the vehicle 100. For example, based on route planning information, refined location in the roadway information, and relative locations and motions of other vehicles, the motion planning and control layer 238 may verify and pass various control commands or instructions to the ADS vehicle control unit 242.

The ADS vehicle control unit 242 may receive the commands or instructions from the motion planning and control layer 238 and translate such information into mechanical control signals for controlling wheel angle, brake and throttle of the vehicle 100. For example, ADS vehicle control unit 242 may respond to the computed steering wheel command angle by sending corresponding control signals to the steering wheel controller.

In various embodiments, the V2X processing system 104 may communicate with other V2X processing system participants (e.g., other vehicles 12, 14, 16) via wireless communication links to transmit sensor data, position data, vehicle data and data gathered about the environment around the vehicle by onboard sensors. Such information may be used by other V2X processing system participants to update stored sensor data for relay to other V2X processing system participants.

In various embodiments, the vehicle V2X processing system 220 may include functionality that performs safety checks or oversight of various commands, planning or other decisions of various layers that could impact vehicle and occupant safety. Such safety check or oversight functionality may be implemented within a dedicated layer or distributed among various layers and included as part of the functionality. In some embodiments, a variety of safety parameters may be stored in memory and the safety checks or oversight functionality may compare a determined value (e.g., relative spacing to a nearby vehicle, distance from the roadway centerline, etc.) to corresponding safety parameter(s), and issue a warning or command if the safety parameter is or will be violated. For example, a safety or oversight function in the behavior planning and prediction layer 240 (or in a separate layer) may determine the current or future separate distance between another vehicle (as defined by the sensor fusion and RWM management layer 236) and the vehicle (e.g., based on the world model refined by the sensor fusion and RWM management layer 236), compare that separation distance to a safe separation distance parameter stored in memory, and issue instructions to the motion planning and control layer 238 to speed up, slow down or turn if the current or predicted separation distance violates the safe separation distance parameter. As another example, safety or oversight functionality in the motion planning and control layer 238 (or a separate layer) may compare a determined or commanded steering wheel command angle to a safe wheel angle limit or parameter, and issue an override command and/or alarm in response to the commanded angle exceeding the safe wheel angle limit.

Some safety parameters stored in memory may be static (i.e., unchanging over time), such as maximum vehicle speed. Other safety parameters stored in memory may be dynamic in that the parameters are determined or updated continuously or periodically based on vehicle state information and/or environmental conditions. Non-limiting examples of safety parameters include maximum safe speed, maximum brake pressure, maximum acceleration, and the safe wheel angle limit, all of which may be a function of roadway and weather conditions.

Figure 3A:
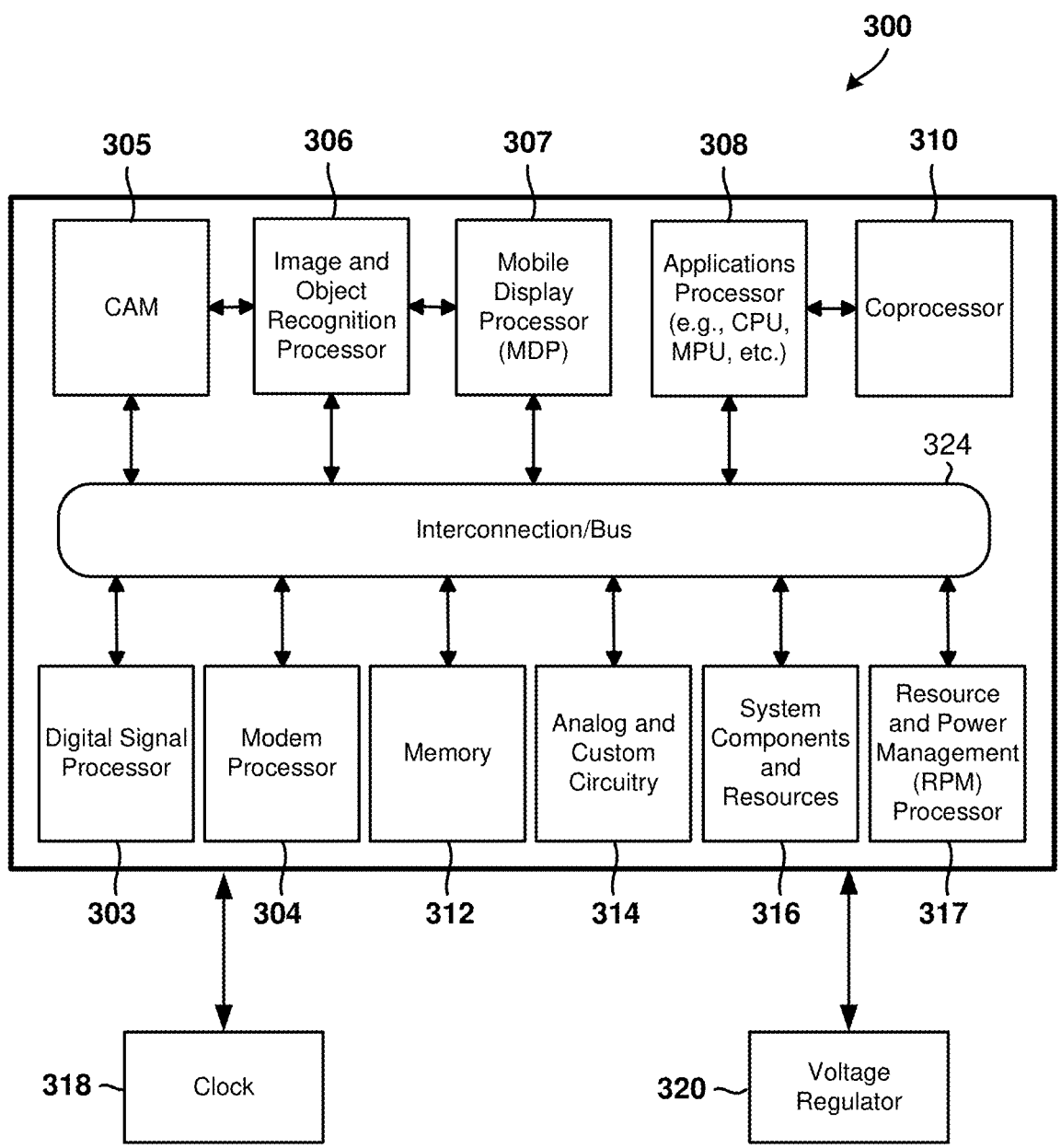
FIG. 3A is a block diagram illustrating components of a system on chip for use in a vehicle V2X processing system in accordance with various embodiments.

FIG. 3A is a block diagram illustrating an example components of a system on chip (SOC) 300 for use in a vehicle V2X processing system in accordance with various embodiments. With reference to FIGS. 1A-3A, the processing device SOC 300 may include a number of heterogeneous processors, such as a digital signal processor (DSP) 303, a modem processor 304, an image and object recognition processor 306, a mobile display processor 307, an applications processor 308, and a resource and power management (RPM) processor 317. The processing device SOC 300 may also include one or more coprocessors 310 (e.g., vector co-processor) connected to one or more of the heterogeneous processors 303, 304, 306, 307, 308, 317.

Each of the processors may include one or more cores, and an independent/internal clock. Each processor/core may perform operations independent of the other processors/cores. For example, the processing device SOC 300 may include a processor that executes a first type of operating system (e.g., FreeBSD, LINUX, OS X, etc.) and a processor that executes a second type of operating system (e.g., Microsoft Windows). In some embodiments, the applications processor 308 may be the SOC's 300 main processor, central processing unit (CPU), microprocessor unit (MPU), arithmetic logic unit (ALU), etc. The graphics processor 306 may be graphics processing unit (GPU).

The processing device SOC 300 may include analog circuitry and custom circuitry 314 for managing sensor data, analog-to-digital conversions, wireless data transmissions, and for performing other specialized operations, such as processing encoded audio and video signals for rendering in a web browser. The processing device SOC 300 may further include system components and resources 316, such as voltage regulators, oscillators, phase-locked loops, peripheral bridges, data controllers, memory controllers, system controllers, access ports, timers, and other similar components used to support the processors and software clients (e.g., a web browser) running on a computing device.

The processing device SOC 300 also include specialized circuitry for camera actuation and management (CAM) 305 that includes, provides, controls and/or manages the operations of one or more cameras (e.g., a primary camera, webcam, 3D camera, etc.), the video display data from camera firmware, image processing, video preprocessing, video front-end (VFE), in-line JPEG, high definition video codec, etc. The CAM 305 may be an independent processing unit and/or include an independent or internal clock.

In some embodiments, the image and object recognition processor 306 may be configured with processor-executable instructions and/or specialized hardware configured to perform image processing and object recognition analyses involved in various embodiments. For example, the image and object recognition processor 306 may be configured to perform the operations of processing images received from cameras via the CAM 305 to recognize and/or identify other vehicles, and otherwise perform functions of the camera perception layer 224 as described. In some embodiments, the processor 306 may be configured to process radar or lidar data and perform functions of the radar and/or lidar perception layer 222 as described.

The system components and resources 316, analog and custom circuitry 314, and/or CAM 305 may include circuitry to interface with peripheral devices, such as cameras, radar, lidar, electronic displays, wireless communication devices, external memory chips, etc. The processors 303, 304, 306, 307, 308 may be interconnected to one or more memory elements 312, system components and resources 316, analog and custom circuitry 314, CAM 305, and RPM processor 317 via an interconnection/bus module 324, which may include an array of reconfigurable logic gates and/or implement a bus architecture (e.g., CoreConnect, AMBA, etc.). Communications may be provided by advanced interconnects, such as high-performance networks-on chip (NoCs).

The processing device SOC 300 may further include an input/output module (not illustrated) for communicating with resources external to the SOC, such as a clock 318 and a voltage regulator 320. Resources external to the SOC (e.g., clock 318, voltage regulator 320) may be shared by two or more of the internal SOC processors/cores (e.g., a DSP 303, a modem processor 304, a graphics processor 306, an applications processor 308, etc.).

In some embodiments, the processing device SOC 300 may be included in a control unit (e.g., 140) for use in a vehicle (e.g., 100). The control unit may include communication links for communication with a telephone network (e.g., 180), the Internet, and/or a network server (e.g., 184) as described.

The processing device SOC 300 may also include additional hardware and/or software components that are suitable for collecting sensor data from sensors, including motion sensors (e.g., accelerometers and gyroscopes of an IMU), user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, WiFi, etc.), and other well-known components of modern electronic devices.

Figure 3B:
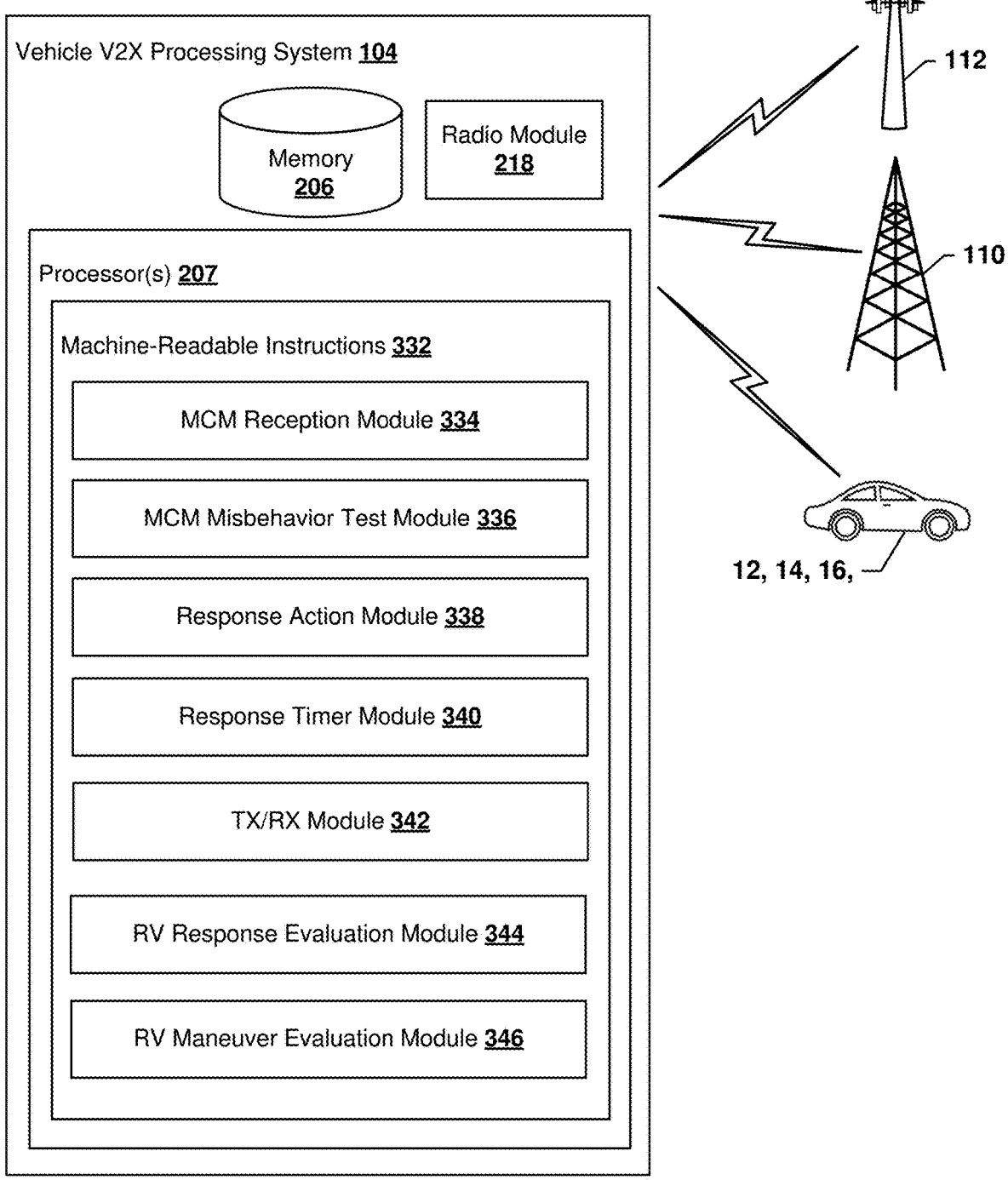
FIG. 3B is a component block diagram illustrating elements of a vehicle V2X processing system configured in accordance with various embodiments.

FIG. 3B is a component block diagram illustrating elements of a vehicle V2X processing system 104 configured in accordance with various embodiments. With reference to FIGS. 1A-3B, the V2X processing system 104 of a vehicle (e.g., 102) may be configured to communicate with a roadside unit 112, a cellular network base station 110, and/or one or more other vehicles 12, 14, 16.

The vehicle V2X processing system 104 may include one or more processors 205, memory 206, a radio module 218, and other components. The vehicle processing system 104 may include a plurality of hardware, software, and/or firmware components operating together to provide the functionality attributed herein to the processor 205.

The memory 206 may include non-transitory storage media that electronically stores information. The electronic storage media of memory 206 may include one or both of system storage that is provided integrally (i.e., substantially non-removable) with the vehicle processing system 104 and/or removable storage that is removably connectable to the vehicle V2X processing system 104 via, for example, a port (e.g., a universal serial bus (USB) port, a firewire port, etc.) or a drive (e.g., a disk drive, etc.). In various embodiments, memory 206 may include one or more of electrical charge-based storage media (e.g., EEPROM, RAM, etc.), solid-state storage media (e.g., flash drive, etc.), optically readable storage media (e.g., optical disks, etc.), magnetically readable storage media (e.g., magnetic tape, magnetic hard drive, floppy drive, etc.), and/or other electronically readable storage media.

The memory 206 may include one or more virtual storage resources (e.g., cloud storage, a virtual private network, and/or other virtual storage resources). Memory 206 may store software algorithms, information determined by processor(s) 205, information received from the one or more other vehicles 12, 14, 16, information received from the roadside unit 112, information received from the base station 110, and/or other information that enables the vehicle V2X processing system 104 to function as described herein.

The processor(s) 205 may include one of more local processors that may be configured to provide information processing capabilities in the vehicle V2X processing system 104. As such, the processor(s) 205 may include one or more of a digital processor, an analog processor, a digital circuit designed to process information, an analog circuit designed to process information, a state machine, and/or other mechanisms for electronically processing information. Although the processor(s) 205 is shown in FIG. 3B as a single entity, this is for illustrative purposes only. In some embodiments, the processor(s) 205 may include a plurality of processing units. These processing units may be physically located within the same device, or the processor(s) 205 may represent processing functionality of a plurality of devices distributed in the vehicle and operating in coordination.

The vehicle V2X processing system 104 may be configured by machine-readable instructions 332, which may include one or more instruction modules. The instruction modules may include computer program modules. In various embodiments, the instruction modules may include one or more of an MCM reception module 334, an MCM misbehavior test module 336, a response action module 338, a response timer module 340, a transmit/receive (TX/RX) module 342, and a remote vehicle (RV) response evaluation processing module 344, an RV maneuver evaluation module 346, and/or other modules.

The MCM reception module 334 may be configured to receive a MCM from another vehicle (e.g., 12, 14, 16).

The MCM misbehavior test module 336 may be configured to perform a test for misbehavior on the MCM.

The response action module 338 may be configured to take an action in response to the test identifying misbehavior associated with the MCM.

The response timer module 340 may be configured to start a timer associated with one or more requests to perform a message sent to a remote vehicle (e.g., 12, 14, 16), and to determine whether the timer has expired.

The TX/RX module 342 may be configured to control the operations of communication devices of the vehicle processing system such as the radio module 218.

The RV response evaluation processing module 344 may be configured to determine whether a remote vehicle (e.g., 12, 14, 16) is unable to respond to one or more requests to perform a maneuver.

The RV maneuver evaluation module 346 may be configured to determine whether a remote vehicle (e.g., 12, 14, 16) is unable to perform an operation related to one or more requests to perform a maneuver.

The processor(s) 205 may be configured to execute the modules 332-346 and/or other modules by software, hardware, firmware, some combination of software, hardware, and/or firmware, and/or other mechanisms for configuring processing capabilities on processor(s) 205.

The description of the functionality provided by the different modules 332-346 is for illustrative purposes, and is not intended to be limiting, as any of modules 332-346 may provide more or less functionality than is described. For example, one or more of modules 332-346 may be eliminated, and some or all of its functionality may be provided by other ones of modules 332-346. As another example, processor(s) 205 may be configured to execute one or more additional modules that may perform some or all of the functionality attributed below to one of modules 332-346.

Figure 3C:
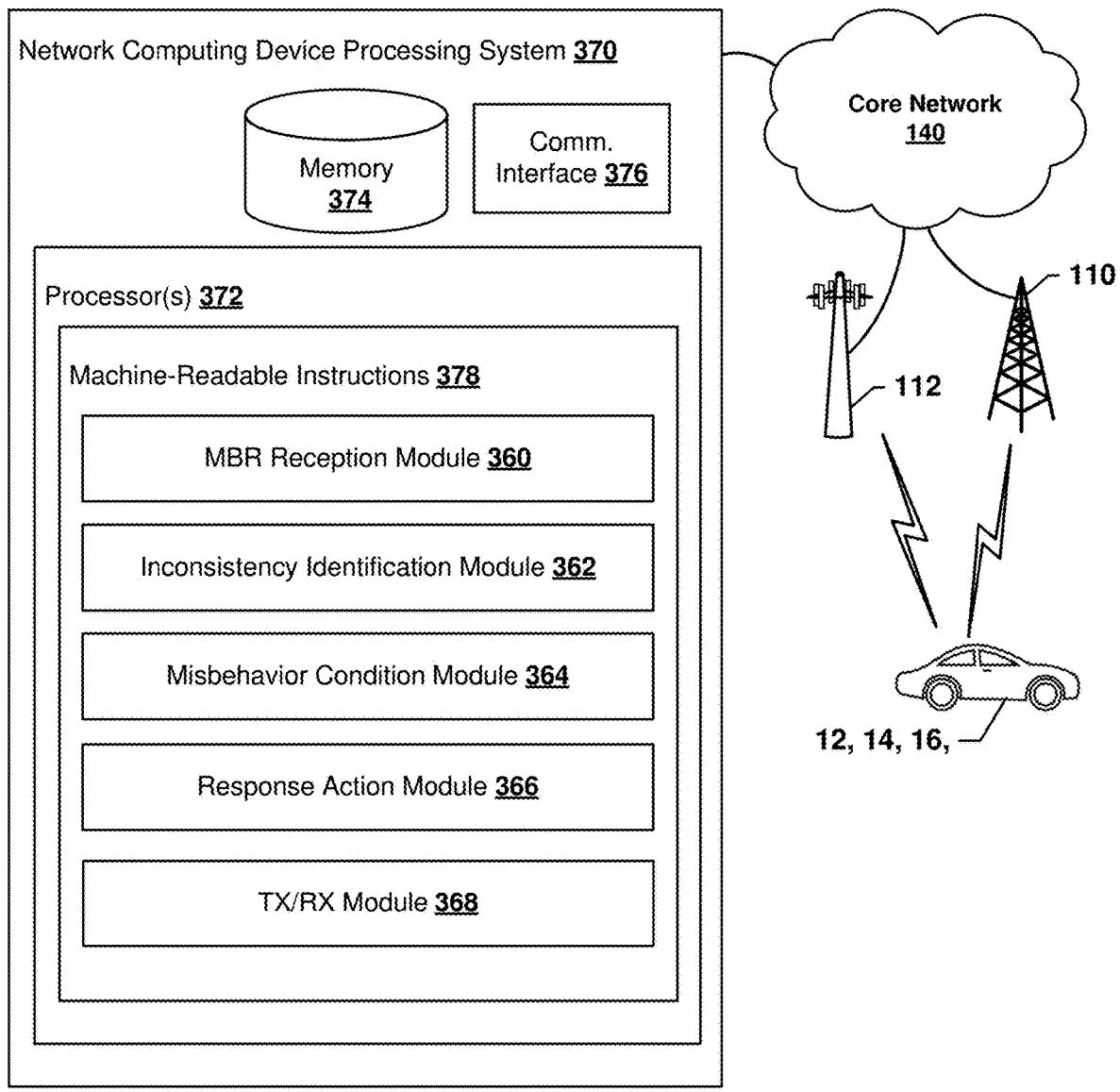
FIG. 3C is a component block diagram illustrating elements of a processing system of a network computing device configured in accordance with various embodiments.

FIG. 3C is a component block diagram illustrating elements of a processing system 370 of a network computing device (e.g., 132) configured in accordance with various embodiments. With reference to FIGS. 1A-3C, the processing system 370 may be configured to communicate with one or more other vehicles 12, 14, 16 via a roadside unit 112 and/or a cellular network base station 110 via a core network (e.g., 140).

The processing system 370 may include one or more processors, memory 374, a wired or wireless communication interface 376, and other components. The processing system 350 may include a plurality of hardware, software, and/or firmware components operating together to provide the functionality attributed herein to the processor 372.

The memory 374 may include non-transitory storage media that electronically stores information. The electronic storage media of memory 374 may include one or both of system storage that is provided integrally (i.e., substantially non-removable) with the network computing device processing system 370 and/or removable storage that is removably connectable to the processing system 370 via, for example, a port (e.g., a universal serial bus (USB) port, a firewire port, etc.) or a drive (e.g., a disk drive, etc.). In various embodiments, memory 374 may include one or more of electrical charge-based storage media (e.g., EEPROM, RAM, etc.), solid-state storage media (e.g., flash drive, etc.), optically readable storage media (e.g., optical disks, etc.), magnetically readable storage media (e.g., magnetic tape, magnetic hard drive, floppy drive, etc.), and/or other electronically readable storage media.

The memory 374 may include one or more virtual storage resources (e.g., cloud storage, a virtual private network, and/or other virtual storage resources). Memory 374 may store software algorithms, information determined by processor(s) 372, information received from the one or more other vehicles 12, 14, 16, information received from the roadside unit 112, information received from the base station 110, and/or other information that enables the processing system 370 to function as described herein.

The processor(s) 372 may include one of more local processors that may be configured to provide information processing capabilities in the processing system 370. As such, the processor(s) 372 may include one or more of a digital processor, an analog processor, a digital circuit designed to process information, an analog circuit designed to process information, a state machine, and/or other mechanisms for electronically processing information. Although the processor(s) 372 is shown in FIG. 3C as a single entity, this is for illustrative purposes only. In some embodiments, the processor(s) 372 may include a plurality of processing units. These processing units may be physically located within the same device, or the processor(s) 372 may represent processing functionality of a plurality of devices distributed in the vehicle and operating in coordination.

The network computing device processing system 370 may be configured by machine-readable instructions 378, which may include one or more instruction modules. The instruction modules may include computer program modules. In various embodiments, the instruction modules may include one or more of a misbehavior report (MBR) reception module 360, an inconsistency identification module 362, a misbehavior condition module 364, a response action module 366, a TX/RX module 368, and/or other modules.

The MBR reception module 360 may be configured to receive a plurality of misbehavior reports indicating MCM misbehavior from a plurality of vehicles.

The inconsistency identification module 362 may be configured to identify an inconsistency among the plurality of misbehavior reports The misbehavior condition module 364 may be configured to identify a misbehavior condition in response to identifying the inconsistency among the plurality of misbehavior reports The response action module 366 may be configured to take an action in response to identifying the misbehavior condition. The response action module 366 may be configured to send to a second network computing device a request for information related to the identified inconsistency among the plurality of misbehavior reports.

The TX/RX module 368 may be configured to control the operations of communication devices of the network computing device processing system 370 such as the communication interface 376.

The processor(s) 372 may be configured to execute the modules 332-346 and/or other modules by software, hardware, firmware, some combination of software, hardware, and/or firmware, and/or other mechanisms for configuring processing capabilities on processor(s) 370.

The description of the functionality provided by the different modules 360-368 is for illustrative purposes, and is not intended to be limiting, as any of modules 360-368 may provide more or less functionality than is described. For example, one or more of modules 360-368 may be eliminated, and some or all of its functionality may be provided by other ones of modules 360-368. As another example, processor(s) 372 may be configured to execute one or more additional modules that may perform some or all of the functionality attributed below to one of modules 360-368.

Figure 4A:
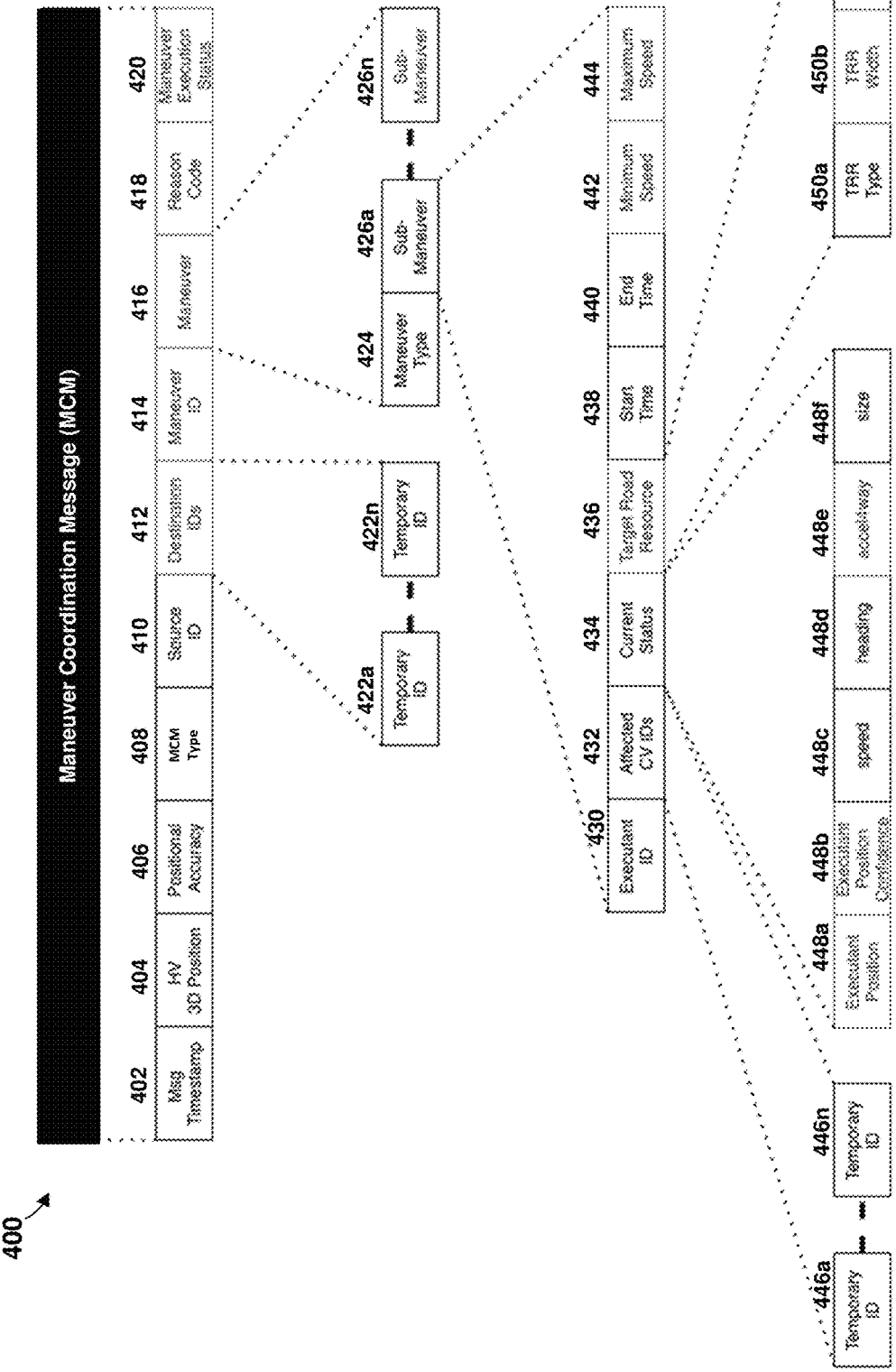
FIG. 4A is a block diagram illustrating elements of a maneuver coordination message suitable for implementing various embodiments.

FIG. 4A is a block diagram illustrating elements of an MCM 400 suitable for implementing various embodiments. With reference to FIGS. 1A-4A, an MCM is a type of V2X message (e.g., a Maneuver Sharing and Coordinating Message) that vehicles equipped with a V2X processing system may transmit, receive, and/or exchange to coordinate vehicle maneuvers. As illustrated in FIG. 4A, the MCM 400 may include a variety of information fields 402-470d. Some fields may be used in other V2X messages (e.g. BSM, CAM, etc.). Examples of fields that may be used in other V2X messages include a message timestamp field 402, a host vehicle three-dimensional position field 404, a positional accuracy field 406, an MCM type 408, a source ID 410, a destination ID 412, a maneuver ID 414, a maneuver 416, a reason code 418, a maneuver execution status field 420, an executant ID field 430, and affected connected vehicle (CV) ID field 432, a current status field 434, a minimum speed field 442, and a maximum speed field 444. Subfields of the current status field 434 may include executant position field 448a, executant position confidence field 448b, speed field 448c, heading field 448d, four-way acceleration (accel4way) field 448e, and size field 448f. Other fields of the MCM 400 may be exclusive to or unique to the MCM 400, such as MCM type field 408, reason code field 418, maneuver execution status field 420, target road resource (TRR) field 436, and various subfields of TRR field 436, such as TRR type field 450a, TRR with field 450b, TRR location field 450c, and TRR movement field 450d.

Figure 4B:
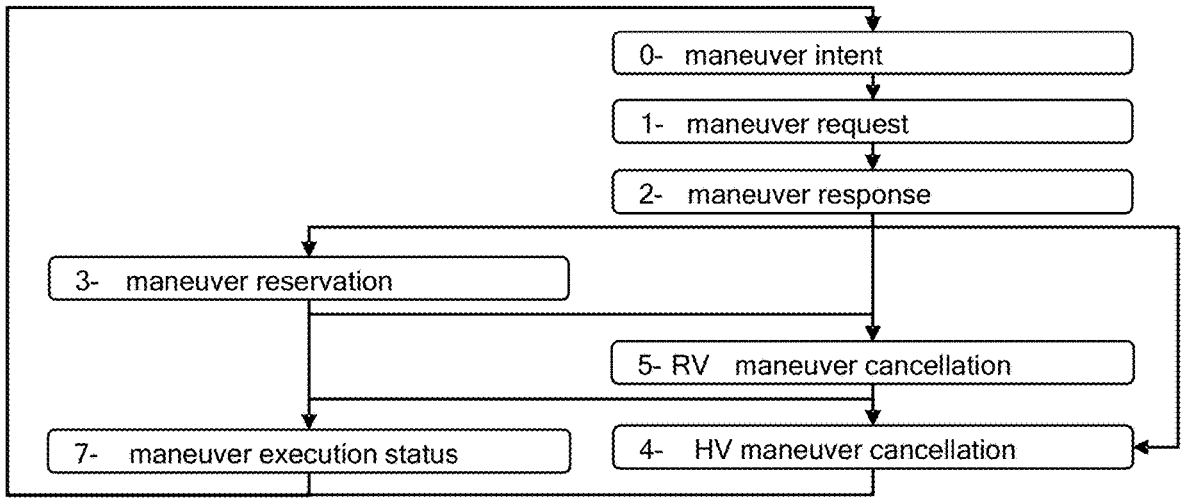
FIG. 4B is a block flow diagram illustrating a basic MCM protocol 460 suitable for implementing various embodiments.

FIG. 4B is a block flow diagram illustrating a basic MCM protocol 460 suitable for implementing various embodiments. With reference to FIGS. 1A-4B, an MCM protocol may a host vehicle (HV) and remote vehicle (RV) exchanging messages to perform a handshake operation or negotiation over a requested or proposed maneuver. The basic MCM protocol 460 may set forth a sequence of MCM messages or MCM message types. For example, message type 0-maneuver intent may be followed by message type 1-message request, which may be followed by message type 2-maneuver response. The next message in sequence according to the basic MCM protocol 460 may be message type 3-maneuver reservation, message type 5-RV maneuver cancellation, or message type 4-HV maneuver cancellation. Message type 5-RV maneuver cancellation also may follow message type 3-maneuver reservation. Message type 4-HV maneuver cancellation also may follow message type 5-RV maneuver cancellation. Further, message type 7-maneuver execution status may follow message type 3-maneuver reservation, message type 5-RV maneuver cancellation, or message type 4-HV maneuver cancellation. The sequence of messages may be repeated, beginning with message type 0-maneuver intent.

Figure 4C:
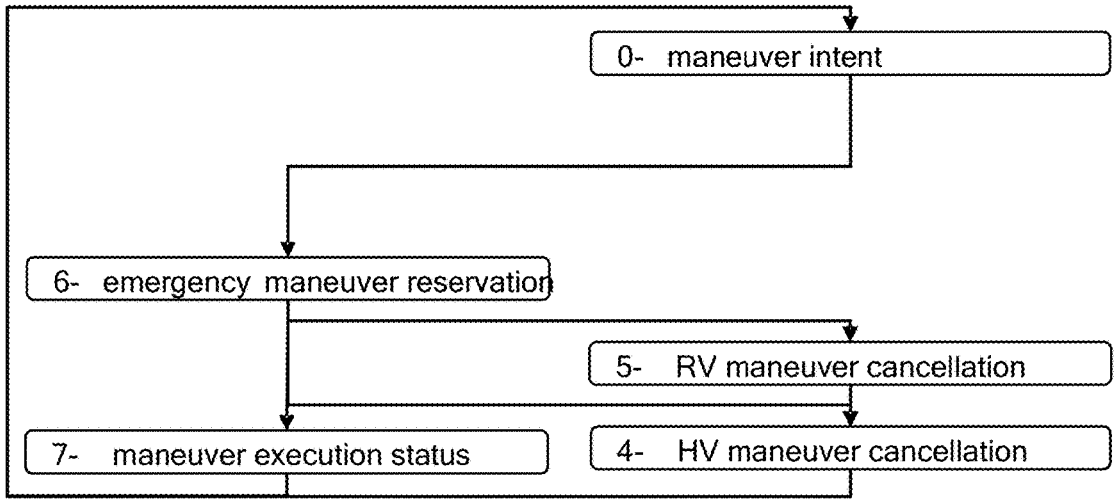
FIG. 4C is a block flow diagram illustrating an emergency MCM protocol 470 suitable for implementing various embodiments.

FIG. 4C is a block flow diagram illustrating an emergency MCM protocol 470 suitable for implementing various embodiments. With reference to FIGS. 1A-4C, the emergency MCM protocol 470 may include similar messages as the basic MCM protocol 460, but may not require certain messages, such as message type 2-maneuver response and message type 3-maneuver reservation.

Figure 4D:
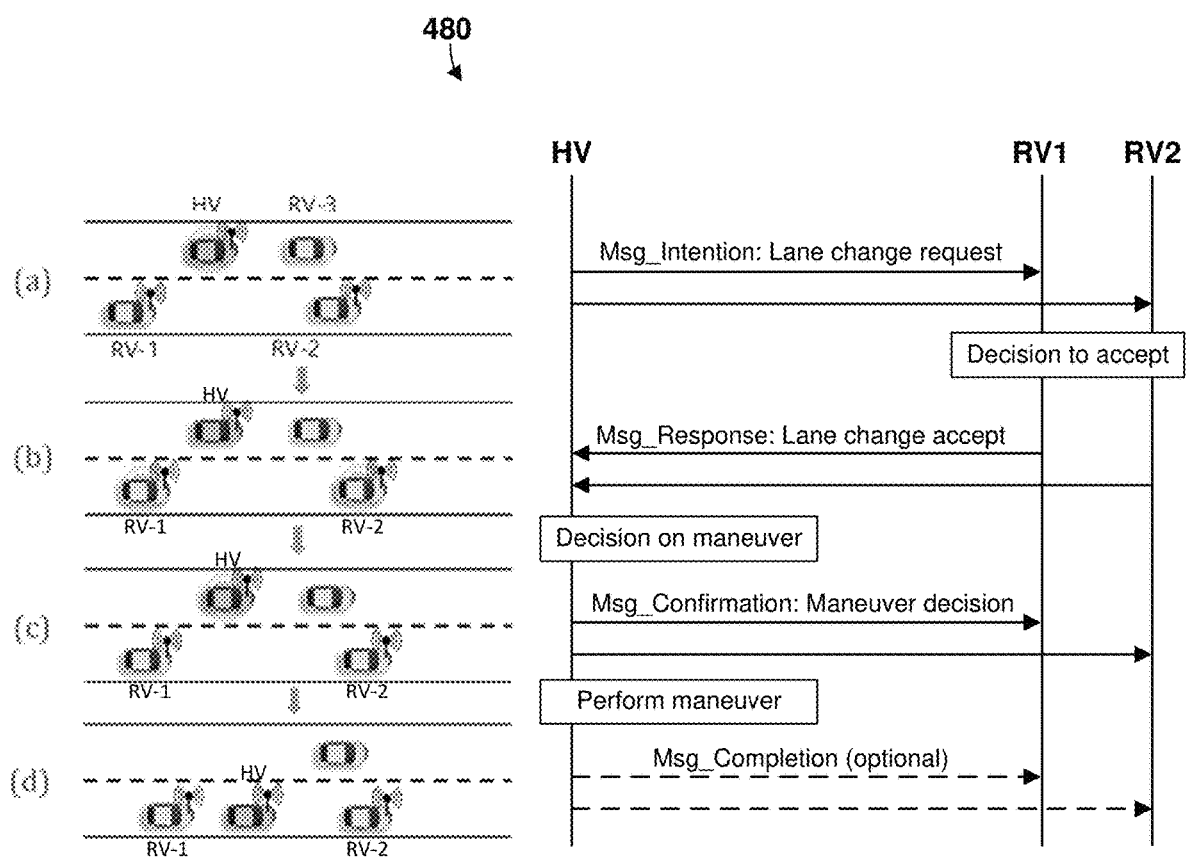
FIG. 4D is message flow diagram illustrating an example of vehicle positions and messages exchanged during a lane change maneuver facilitated by maneuver coordination messages.

FIG. 4D is a message flow diagram and accompanying schematic illustrating vehicles performing maneuver negotiations 480 (e.g., handshake operations) of an example lane change maneuver facilitated by MCM between HVs and RVs.

With reference to FIGS. 1A-4D, at time (a), a host vehicle (HV) may send an MCM requesting or proposing that the HV perform a lane change (Msg_Intention: Lane change request) to a first remote vehicle (RV1) and a second remote vehicle (RV2). RV1 and RV2 may each decide to accept the lane change maneuver requested or proposed by the HV (Decision to accept).

At time (b), RV1 and RV2 may send an MCM to the HV accepting the proposed lane change (Msg_Response: Lane change accept). The HV may make a decision (or decisions) regarding details of the maneuver.

At time (c), the HV may send a message informing RV1 and RV2 of details of the maneuver of the HV (Msg_confirmation: Maneuver decision). The HV may been perform the maneuver (Perform maneuver). Optionally, after performing the maneuver, the HV may send a message to RV1 and RV2 indicating that the HV has completed the maneuver (Msg_Completion). The maneuver negotiations 480 represent but one example of maneuver negotiations that may be performed between HVs and RVs.

In operation, vehicles may assume different roles from time to time, so that a vehicle acting as an HV at one time may act as an RV at another time, and so forth. Maneuver negotiations 480 may be performed extremely rapidly among a number of vehicles, enabling the vehicles to quickly and effectively coordinate various maneuvers.

Figure 5A:
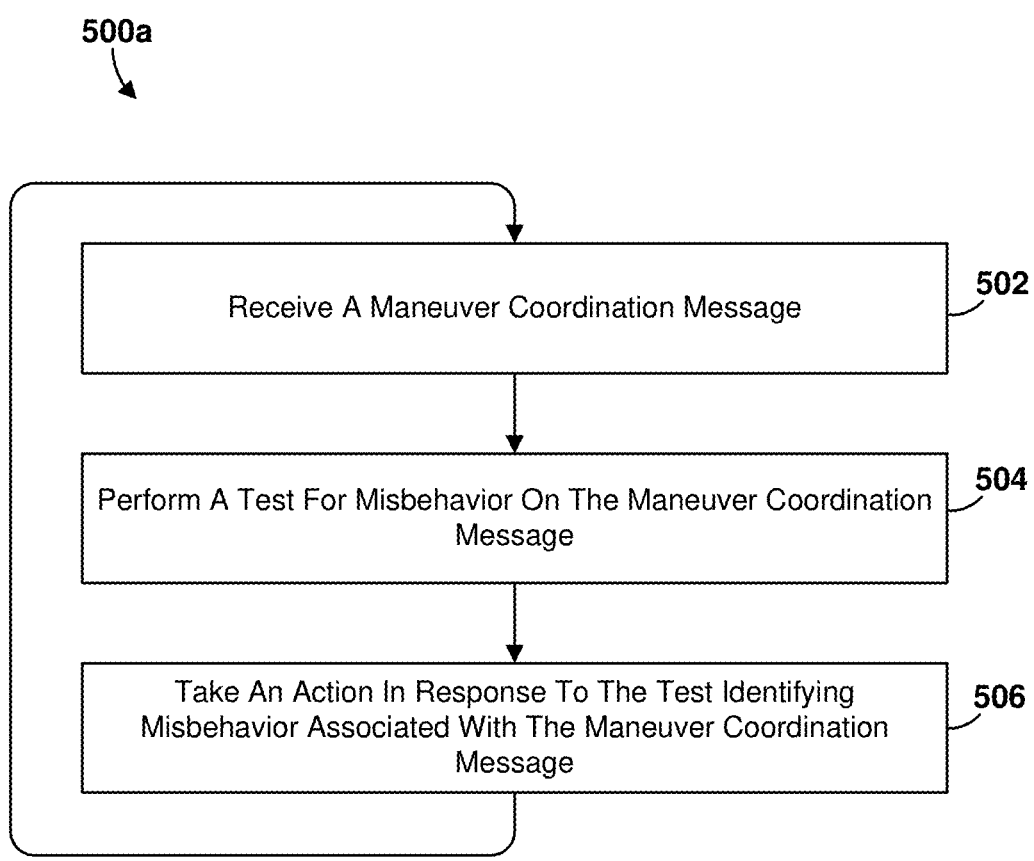
FIG. 5A is a process flow diagram of an example method performed by a processor of a V2X processing system in a vehicle for misbehavior detection in a maneuver coordination message in accordance with various embodiments.

FIG. 5A is a process flow diagram of an example method 500a performed by a processor of a V2X processing system in a vehicle for misbehavior detection in a MCM in accordance with various embodiments. With reference to FIGS.

1A-5A, the method 500*a* may be performed by one or more processors (e.g., 205, 300) of a V2X processing system or other vehicle processor (e.g., 205, 220, 300) that may be implemented in hardware elements, software elements, or a combination of hardware and software elements.

In block 502, the V2X processing system may receive an MCM. In some embodiments, the MCM may include a first field and a second field. Means for performing the operations of block 502 may include a processor (e.g., 205, 303, 304, 306, 307, 308, 310) executing the MCM reception module 334 and the radio module 218.

In block 504, the V2X processing system may perform a test for misbehavior on the MCM. A number of different tests may be performed in block 504 in various embodiments. Means for performing the operations of block 504 may include a processor (e.g., 205, 303, 304, 306, 307, 308, 310) executing the MCM misbehavior test module 336.

In some embodiments, performing a test for misbehavior on the MCM in block 504 may include determining whether information in a MCM type field is inconsistent with the presence or absence of one or more second fields. In some embodiments, performing a test for misbehavior on the MCM in block 504 may include determining whether information in a TRR location field is inconsistent with information in a TRR type field. In some embodiments, performing a test for misbehavior on the MCM in block 504 may include determining whether information in an executant ID field is inconsistent with information in a source ID field or information in a destination ID field. In some embodiments, performing a test for misbehavior on the MCM in block 504 may include determining whether information in a maximum speed field is inconsistent with a TRR location field.

In some embodiments, performing a test for misbehavior on the MCM in block 504 may include determining whether first information in one or more fields related to an intended maneuver of the vehicle is inconsistent with second information in one or more second fields related to the intended maneuver of the vehicle. In some embodiments, the first information in one or more fields related to an intended maneuver of the vehicle or the second information in one or more second fields related to the intended maneuver of the vehicle may exceed a threshold. In some embodiments, the first information in one or more fields related to an intended maneuver of the vehicle or the second information in one or more second fields related to the intended maneuver of the vehicle may indicate an overlap of a TRR.

In block 506, the V2X processing system may take an action in response to the test identifying misbehavior associated with the MCM. In some embodiments, V2X processing system may send a misbehavior report to a network computing device in response to determining the misbehavior condition. Means for performing the operations of block 506 may include a processor (e.g., 205, 303, 304, 306, 307, 308, 310) executing the response action module 338 and the radio module 218.

The V2X processing system may repeat the operations of blocks 502-506 from time to time, such as periodically or in response to receiving one or more MCMs.

FIGS. 5B-5G are process flow diagrams of example operations 500*b*-500*g* that may be performed by a processor of a vehicle V2X processing system as part of the method 500*a* for misbehavior detection in a MCM in accordance with various embodiments. With reference to FIGS. 1A-5G, the operations 500*b*-500*g* may be performed by a processor (e.g., 205, 300) of a V2X processing system or other vehicle processor (e.g., 104, 205, 220, 300) that may be implemented in hardware elements, software elements, or a combination of hardware and software elements.

Figure 5B:
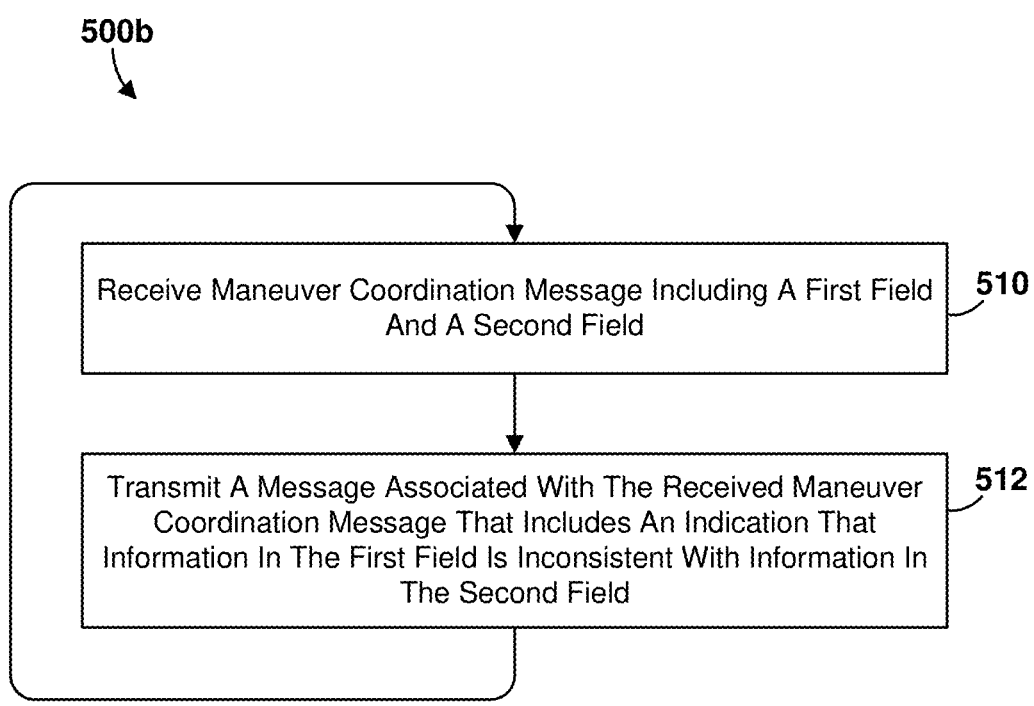
FIGS. 5B-5G are process flow diagrams of example operations that may be performed by a processor of a vehicle V2X processing system as part of the method for misbehavior detection in a maneuver coordination message in accordance with various embodiments.

With reference to FIGS. 1A-5B, in operations 500*b* illustrated in FIG. 5B the V2X processing system may receiving a MCM including a first field and a second field in block 510. Means for performing the operations of block 510 may include a processor (e.g., 205, 303, 304, 306, 307, 308, 310) executing the MCM reception module 334.

In block 512, the V2X processing system may transmit a message associated with the received MCM that includes an indication that information in the first field is inconsistent with information in the second field. Means for performing the operations of block 512 may include a processor (e.g., 205, 303, 304, 306, 307, 308, 310) executing the TX/RX module 342 and the radio module 218.

The V2X processing system may repeat the operations of blocks 510 and 512.

Figure 5C:
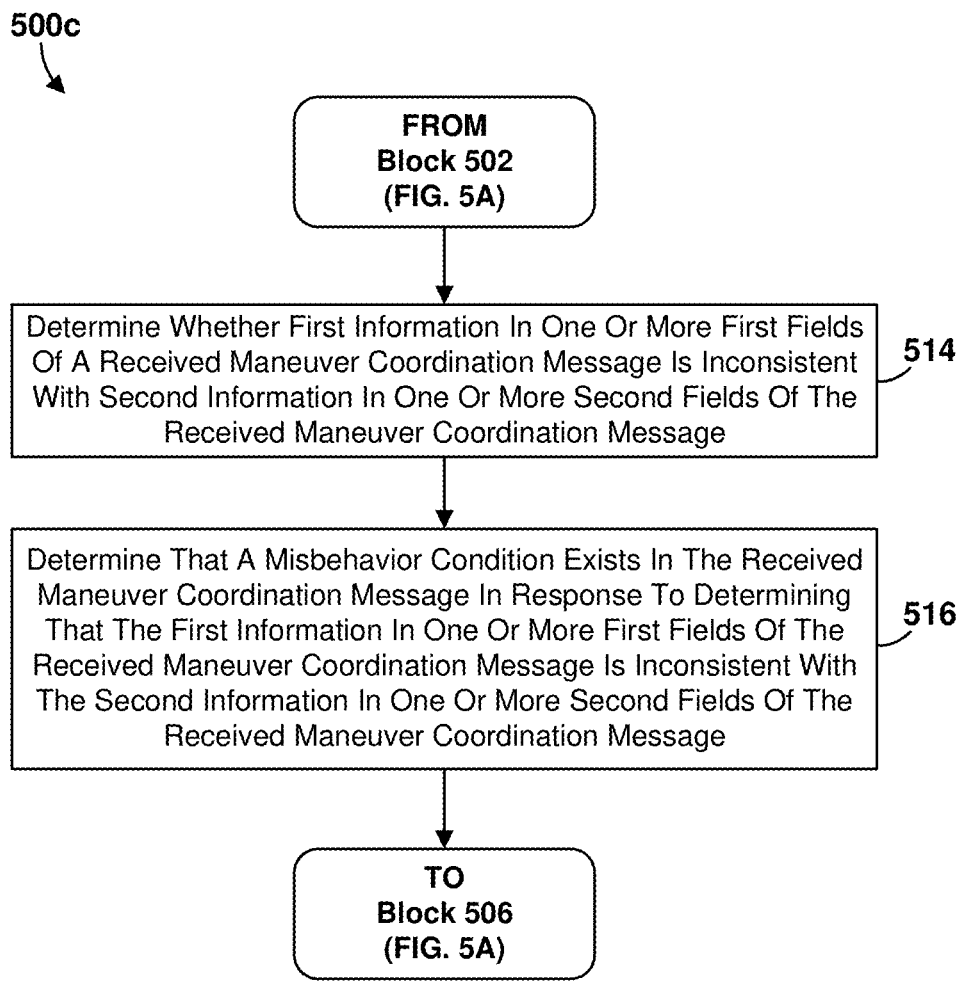

With reference to FIGS. 1A-5C, in operations 500*c* illustrated in FIG. 5C after receiving an MCM in block 502 (FIG. 5A) as described, the V2X processing system may determine whether first information in one or more first fields of a received MCM is inconsistent with second information in one or more second fields of the received MCM in block 514. Means for performing the operations of block 514 may include a processor (e.g., 205, 303, 304, 306, 307, 308, 310) executing the MCM misbehavior test module 336.

In block 516, the V2X processing system may determine that a misbehavior condition exists in the received MCM in response to determining that the first information in one or more first fields of the received MCM is inconsistent with the second information in one or more second fields of the received MCM. Means for performing the operations of block 516 may include a processor (e.g., 205, 303, 304, 306, 307, 308, 310) executing the MCM misbehavior test module 336.

The V2X processor may take an action in response to the test identifying misbehavior associated with the MCM in block 506 of the method 500*a* as described.

Figure 5D:
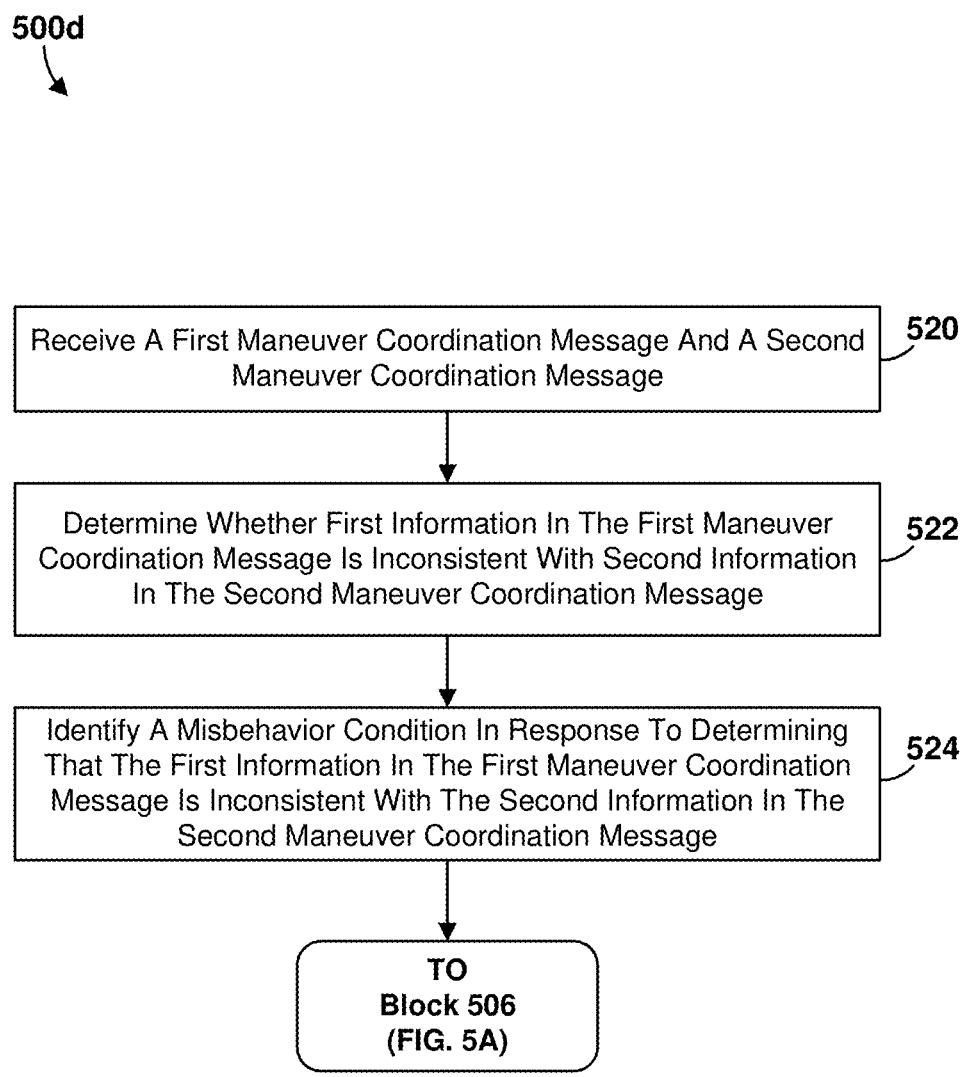

With reference to FIGS. 1A-5D, in operations 500*d* illustrated in FIG. 5D the V2X processing system may receive a first MCM and a second MCM in block 520. Means for performing the operations of block 520 may include a processor (e.g., 205, 303, 304, 306, 307, 308, 310) executing the MCM reception module 334 and the radio module 218.

In block 522, the V2X processing system may determine whether first information in the first MCM is inconsistent with second information in the second MCM. For example, the first MCM and the second MCM may be out of sequence, such as a sequence of MCM messages or a sequence of MCM message types. For example, the first MCM may include a message type 5-RV maneuver cancellation, and the second MCM may include a message type 3-maneuver reservation. As another example, the first MCM may include a message type 4-HV maneuver cancellation, and the second MCM may include a message type 3-maneuver reservation. In these examples, according to a protocol such as the basic MCM protocol 460 (FIG. 4B), the first and second MCMs are out of sequence. Means for performing the operations of block 522 may include a processor (e.g., 205, 303, 304, 306, 307, 308, 310) executing the MCM misbehavior test module 336.

In block 524, the V2X processing system may identify a misbehavior condition in response to determining that the first information in the first MCM is inconsistent with the second information in the second MCM. Means for performing the operations of block 524 may include a processor (e.g., 205, 303, 304, 306, 307, 308, 310) executing the MCM misbehavior test module 336.

The V2X processor may take an action in response to the test identifying misbehavior associated with the MCM in block 506 of the method 500a as described.

Figure 5E:
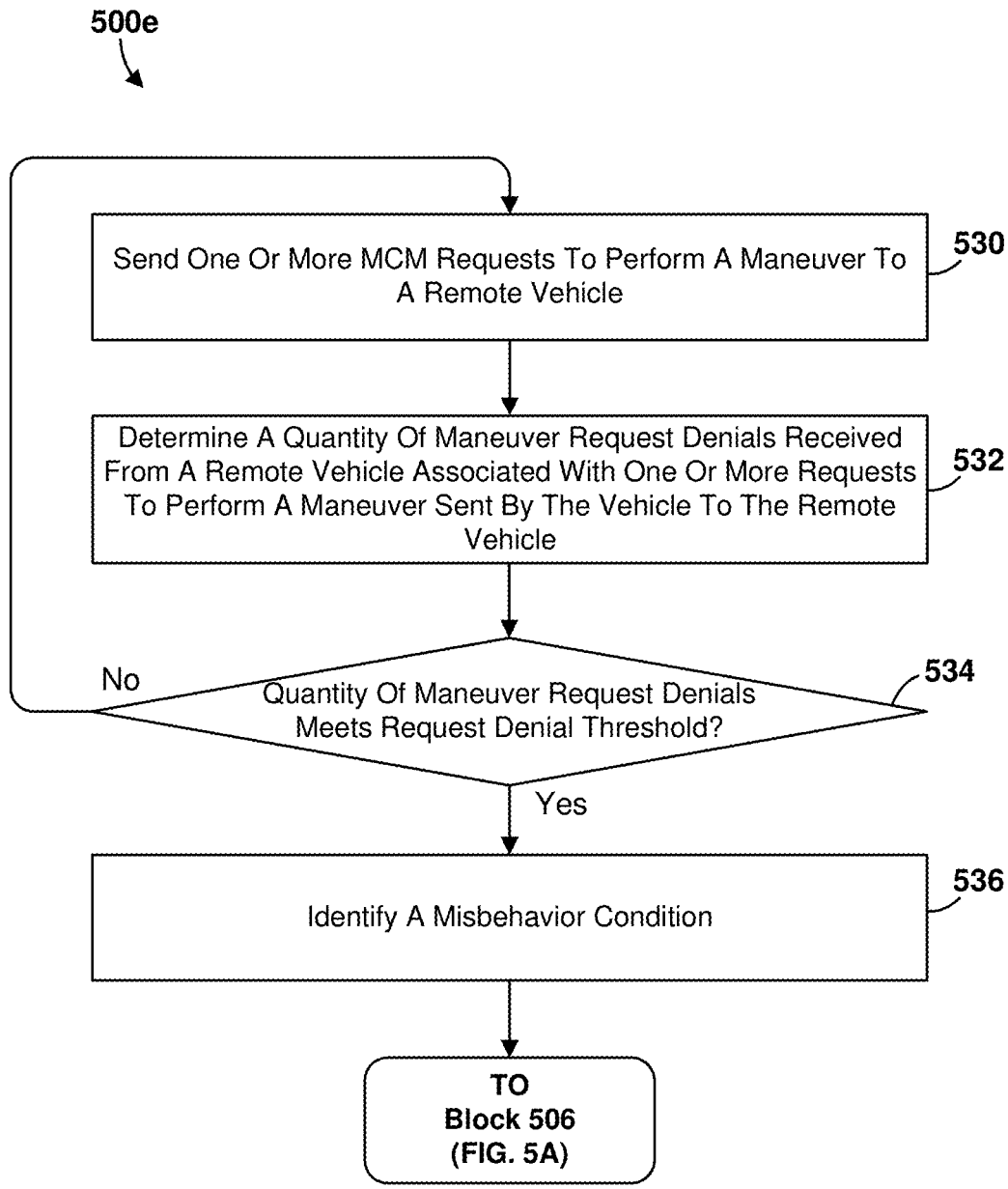

With reference to FIGS. 1A-5E, in operations 500e illustrated in FIG. 5E the V2X processing system may send one or more MCM requests to perform a maneuver to a remote vehicle in block 530. Means for performing the operations of block 530 may include a processor (e.g., 205, 303, 304, 306, 307, 308, 310) executing the TX/RX module 342 and the radio module 218.

In block 532, the V2X processing system may determine a quantity of maneuver request denials received from a remote vehicle associated with the one or more MCM requests to perform a maneuver sent by the vehicle to the remote vehicle. Means for performing the operations of block 532 may include a processor (e.g., 205, 303, 304, 306, 307, 308, 310) executing the RV response evaluation module 344.

In determination block 534, the V2X processing system may determine whether a quantity of maneuver request denials meets a request denial threshold. Means for performing the operations of determination block 534 may include a processor (e.g., 205, 303, 304, 306, 307, 308, 310) executing the RV response evaluation module 344.

In response to determining that the quantity of maneuver request denials does not meet the request denial threshold (i.e., determination block 534="No"), the V2X processing system may continue to send MCM requests to perform a maneuver to the remote vehicle in block 530.

In response to determining that the quantity of maneuver request denials meets the request denial threshold (i.e., determination block 534="Yes"), the V2X processing system may identify a misbehavior condition in block 536. Means for performing the operations of determination block 536 may include a processor (e.g., 205, 303, 304, 306, 307, 308, 310) executing the MCM misbehavior test module 336.

The V2X processing system may take an action in response to identifying the misbehavior associated with the MCM in block 506 of the method 500a as described.

Figure 5F:
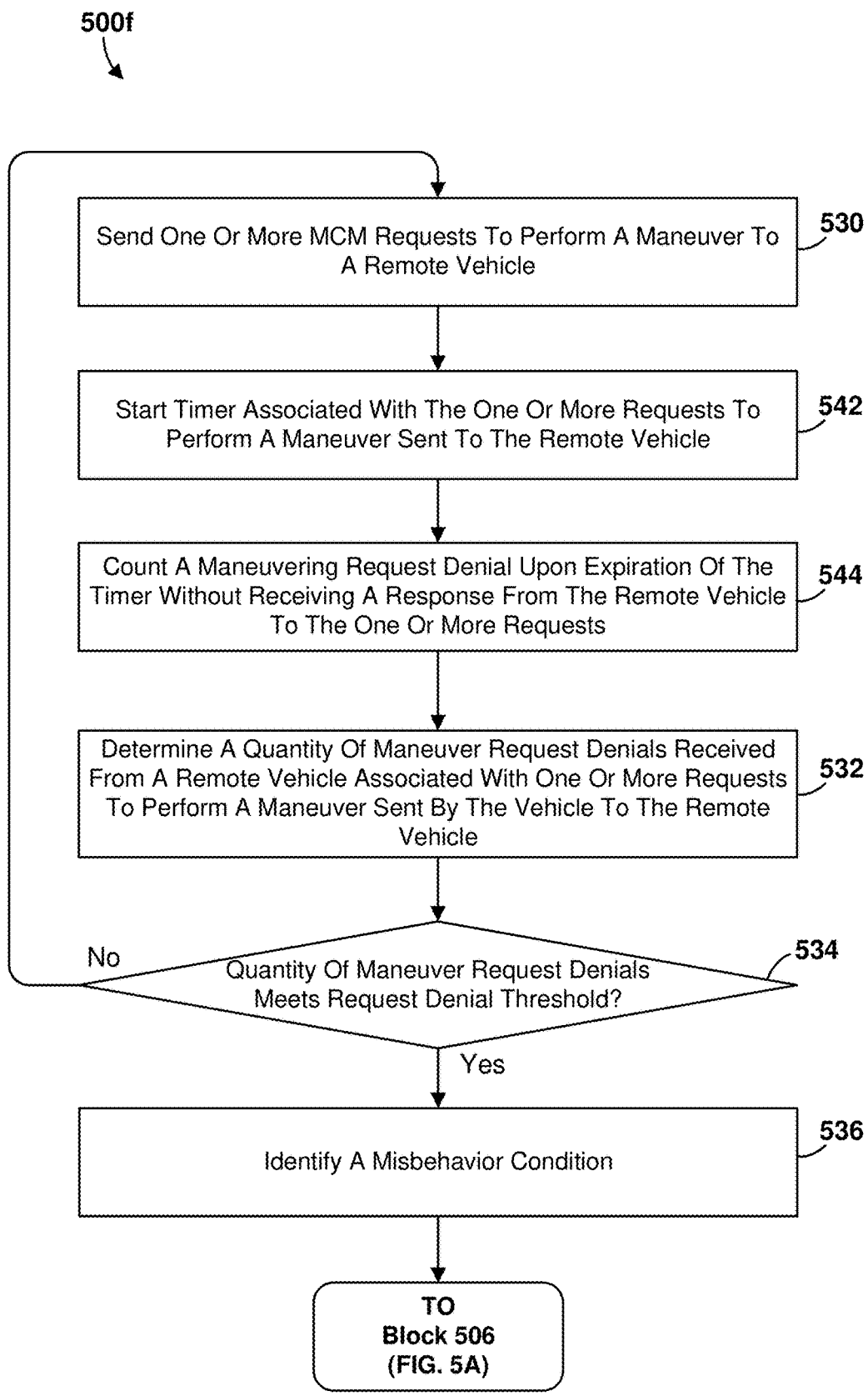

With reference to FIGS. 1A-5F, in operations 500f illustrated in FIG. 5F the V2X processing system may send one or more MCM requests to perform a maneuver to a remote vehicle in block 530 as described.

In block 542, the V2X processing system may start a timer associated with the one or more MCM requests to perform a maneuver sent to the remote vehicle. Means for performing the operations of block 542 may include a processor (e.g., 205, 303, 304, 306, 307, 308, 310) executing the response timer module 340.

In block 544, the V2X processing system may count a maneuvering request denial upon expiration of the timer without receiving a response from the remote vehicle to the one or more requests. For example, the V2X processing system may increment or add to a counter of a quantity of maneuvering request denials received from the remote vehicle. Means for performing the operations of block 544 may include a processor (e.g., 205, 303, 304, 306, 307, 308, 310) executing the RV response evaluation module 344.

The V2X processing system may then determine a quantity of maneuver request denials received from a remote vehicle associated with the one or more MCM requests to perform a maneuver sent by the vehicle to the remote vehicle in block 532 and perform the operations in block 506 of the method 500a as described.

Figure 5G:
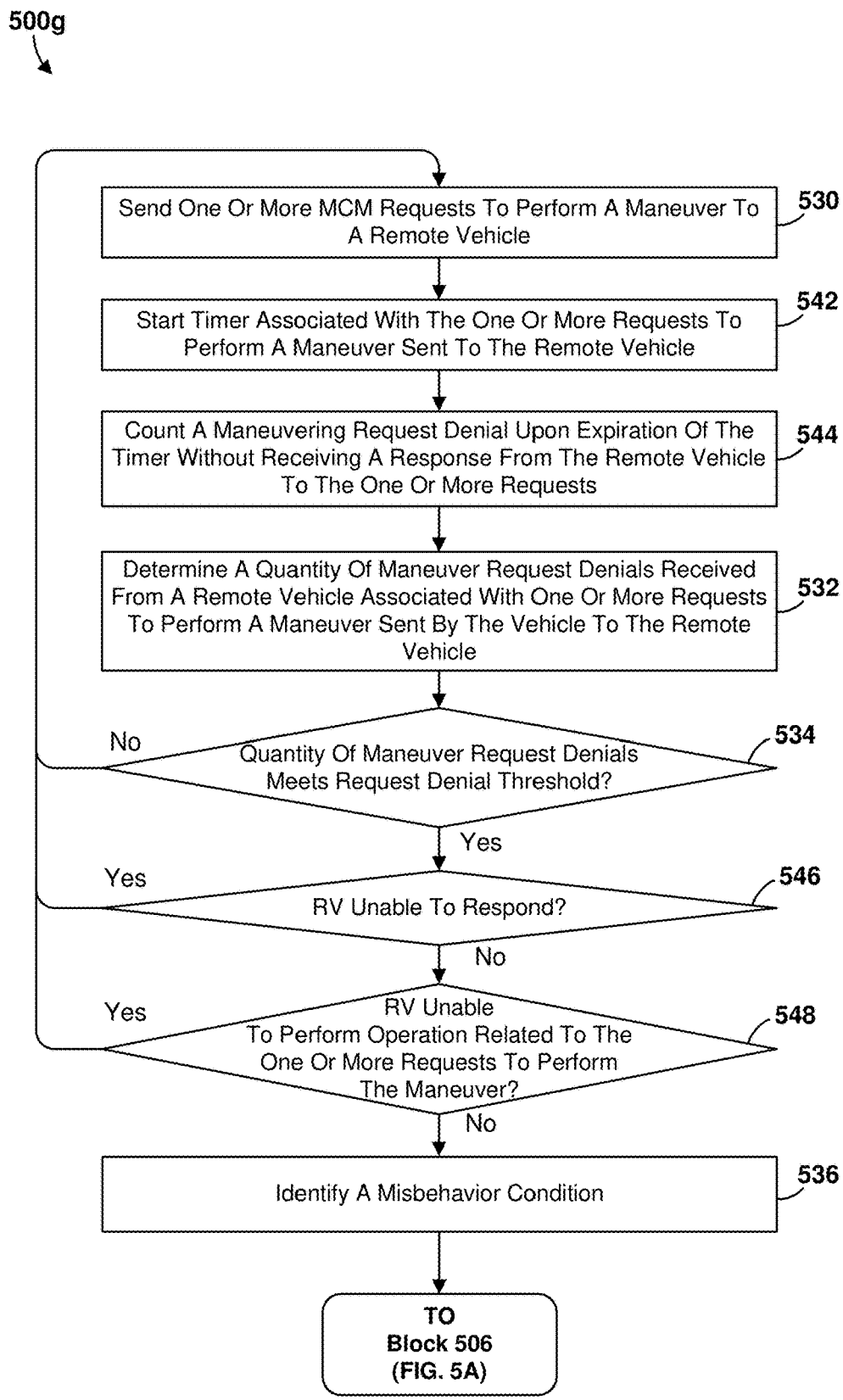

With reference to FIGS. 1A-5G, in operations 500g illustrated in FIG. 5G the V2X processing system may determine whether a quantity of maneuver request denials meets a request denial threshold in determination block 534, as described.

In response to determining that the quantity of maneuver request denials meets the request denial threshold (i.e., determination block 534="Yes"), the V2X processing system may determine whether the remote vehicle (RV) is unable to respond to the one or more MCM requests to perform the maneuver in determination block 546. For example, the V2X processing system may determine whether wireless communication link conditions permit or prevent V2X communication. For example, the V2X processing system may determine that wireless communication link interference, message or signal congestion, or another factor is interfering with V2X communication with the remote vehicle. As another example, the V2X processing system may determine whether the remote vehicle is within communication range, based on, for example, information in another V2X message (such as a BSM or CAM), or based on information from one or more sensors of the vehicle (for example, information from a camera, radar, lidar, and/or the like). Means for performing the operations of determination block 546 may include a processor (e.g., 205, 303, 304, 306, 307, 308, 310) executing the RV response evaluation module 344.

In response to determining that the remote vehicle is unable to respond (i.e., determination block 546="Yes"), the V2X processing system may send one or more MCM requests to perform a maneuver to the remote vehicle in block 530.

In response to determining that the remote vehicle is able to respond (i.e., determination block 546="No," not unable to respond), the V2X processing system may determine whether the remote vehicle is unable to perform an operation related to the one or more requests to perform the maneuver in determination block 548. For example, the V2X processing system may determine whether the road environment permits or prevents completion or performance of a maneuver (for example, based on information in another V2X message, information from vehicle sensors, information from a digital map such as a High Definition map, and/or the like).

Means for performing the operations of determination block 548 may include a processor (e.g., 205, 303, 304, 306, 307, 308, 310) executing the RV response evaluation module 344.

In response to determining that the remote vehicle is unable to perform an operation related to the one or more requests to perform the maneuver (i.e., determination block 546="Yes"), the V2X processing system may send one or more MCM requests to perform a maneuver to the remote vehicle in block 530.

In response to determining that the remote vehicle is able to perform an operation related to the one or more requests to perform the maneuver (i.e., determination block 546="No," not unable to perform the operation), the V2X processing system may identify a misbehavior condition in block 536 and perform the operations in block 506 of the method 500a as described.

Figure 6:
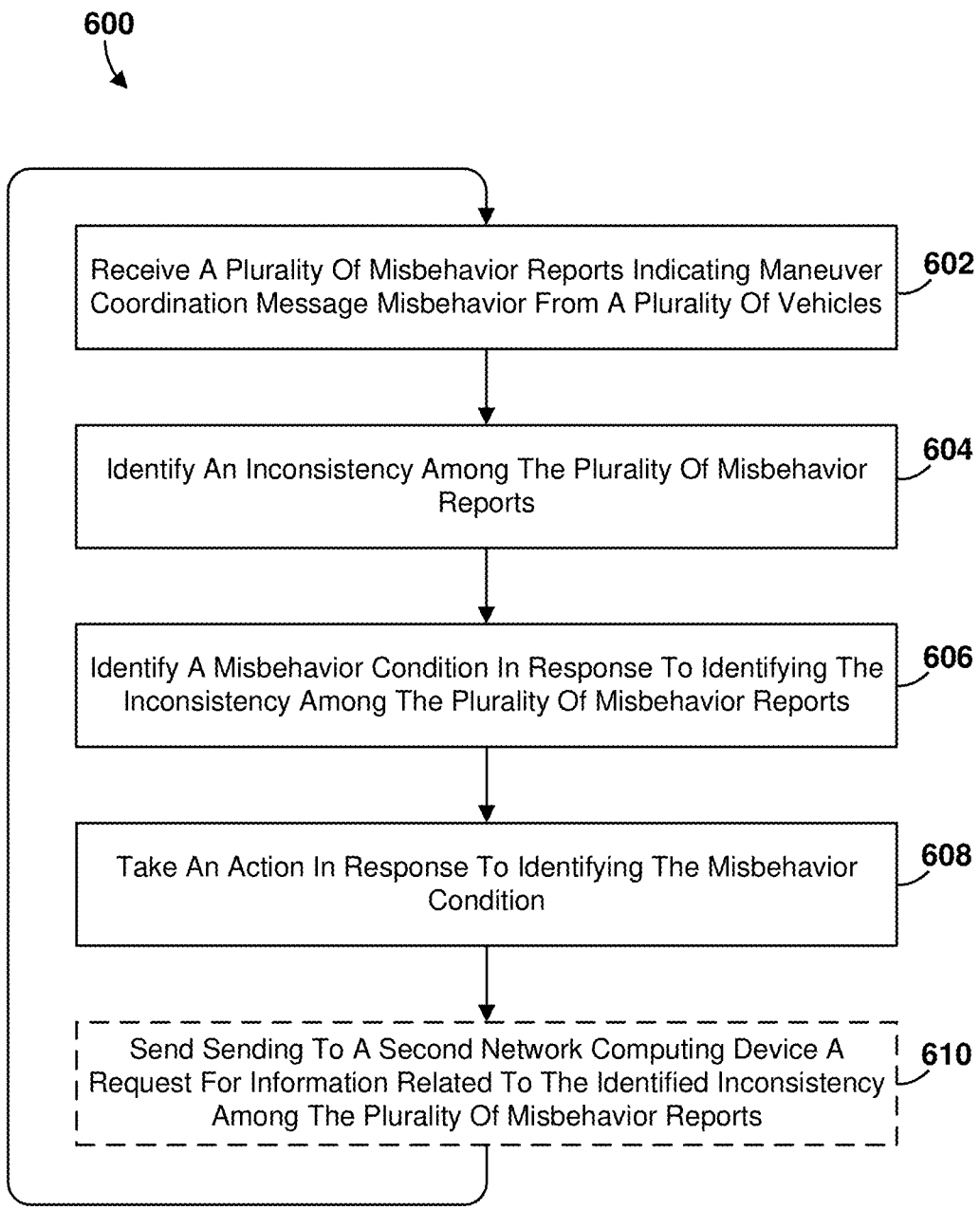
FIG. 6 is a process flow diagram of an example method 600 performed by a processor of a network computing device processing system of a V2X network for misbehavior detection in a maneuver coordination message in accordance with various embodiments.

FIG. 6 is a process flow diagram of an example method 600 performed by a processor of a network computing device processing system of a V2X network for misbehavior detection in a MCM in accordance with various embodiments. With reference to FIGS. 1A-6, the method 600 may be performed by one or more processors (e.g., 303, 304, 306, 307, 308, 310, 352) of a network computing device (132, 350) that may be implemented in hardware elements, software elements, or a combination of hardware and software elements.

In block 602, the network computing device processing system may receive a plurality of misbehavior reports indicating MCM misbehavior from a plurality of vehicles. Means for performing the operations of block 502 may include a processor (e.g., 303, 304, 306, 307, 308, 310, 352) executing the MCM reception module 334 and the communication interface 356.

In block 604, the network computing device processing system may identify an inconsistency among the plurality of misbehavior reports. In some embodiments, identifying the inconsistency among the plurality of misbehavior reports may include determining that the vehicle is impersonating multiple vehicles. In some embodiments, identifying the inconsistency among the plurality of misbehavior reports may include determining that a vehicle identified in the plurality of MCMs has not sent a misbehavior report to the network computing device. Means for performing the operations of block 502 may include a processor (e.g., 303, 304, 306, 307, 308, 310, 352) executing the inconsistency identification module 362.

In block 606, the network computing device processing system may identify a misbehavior condition in response to identifying the inconsistency among the plurality of misbehavior reports. Means for performing the operations of block 502 may include a processor (e.g., 303, 304, 306, 307, 308, 310, 352) executing the misbehavior condition module 364.

In block 608, the network computing device processing system may take an action in response to identifying the misbehavior condition. For example, the network computing device processing system may revoke a digital certificate of the determined attacker vehicle to deny the attacker access to the V2X communication network. Means for performing the operations of block 502 may include a processor (e.g., 303, 304, 306, 307, 308, 310, 352) executing the response action module 366.

In optional block 610, the network computing device processing system may send to a second network computing device a request for information related to the identified inconsistency among the plurality of misbehavior reports. The Means for performing the operations of optional block 610 may include a processor (e.g., 303, 304, 306, 307, 308, 310, 352) executing the MCM reception module 334 and the communication interface 356.

Figure 7:
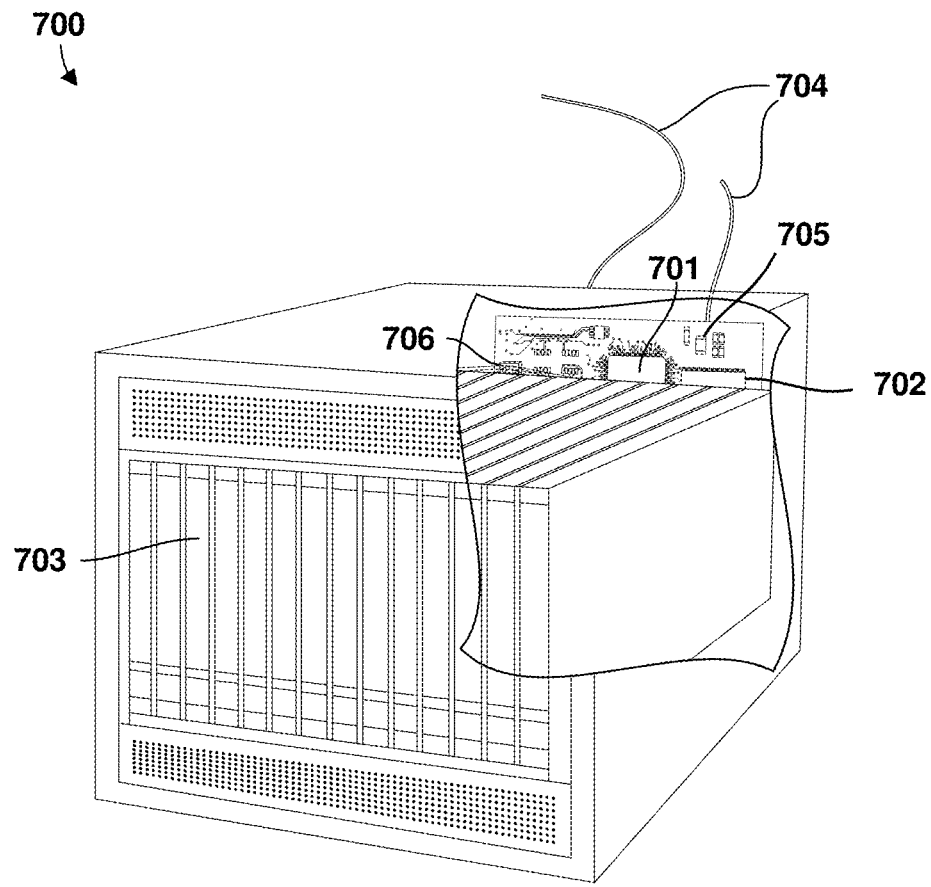
FIG. 7 is a component block diagram of a computing device suitable for use with various embodiments.

FIG. 7 is a component block diagram of a network computing device 700 suitable for use with various embodiments. With reference to FIGS. 1A-7, various embodiments (including, but not limited to, embodiments described with reference to FIGS. 4A-6) may be implemented on a variety of computing devices, an example of which is illustrated in FIG. 7 in the form of a server device. A network computing device 700 may include a processor 701 coupled to volatile memory 702 and a large capacity nonvolatile memory, such as a disk drive 703. The network computing device 700 may also include a peripheral memory access device such as a floppy disc drive, compact disc (CD) or digital video disc (DVD) drive 706 coupled to the processor 701. The network computing device 700 may also include network access ports 704 (or interfaces) coupled to the processor 701 for establishing data connections with a network, such as the Internet and/or a local area network coupled to other system computers and servers. The network computing device 700 may include one or more transceivers 705 for sending and receiving electromagnetic radiation that may be connected to a wireless communication link. The network computing device 700 may include additional access ports, such as USB, Firewire, Thunderbolt, and the like for coupling to peripherals, external memory, or other devices.

Implementation examples are described in the following paragraphs. While some of the following implementation examples are described in terms of example methods, further example implementations may include: the example methods discussed in the following paragraphs implemented by a V2X processing system that may be an on-board unit, mobile device unit, or mobile computing unit, or a processing system of a network computing device, including a processor configured with processor-executable instructions to perform operations of the methods of the following implementation examples; the example methods discussed in the following paragraphs implemented by a vehicle V2X processing system or a processing system of a network computing device including means for performing functions of the methods of the following implementation examples; and the example methods discussed in the following paragraphs may be implemented as a non-transitory processor-readable storage medium having stored thereon processor-executable instructions configured to cause a processor of a V2X processing system or a network computing device processing system to perform the operations of the methods of the following implementation examples.

Example 1. A method performed by a vehicle-to-everything (V2X) processing system of a vehicle for misbehavior detection on maneuver coordination messages, including: receiving a first maneuver coordination message; performing a test for misbehavior on the first maneuver coordination message; and taking an action in response to the test identifying misbehavior associated with the first maneuver coordination message.

Example 2. The method of example 1, in which: receiving the first maneuver coordination message includes receiving a first maneuver coordination message including a first field and a second field; and performing the test for misbehavior on the first maneuver coordination message and taking an action in response to the test identifying misbehavior associated with the first maneuver coordination message includes transmitting a message associated with the received first maneuver coordination message that includes an indication that information in the first field is inconsistent with information in the second field.

Example 3. The method of any of examples 1-2, in which performing the test for misbehavior on the first maneuver coordination message includes: determining whether first information in one or more first fields of a first maneuver coordination message is inconsistent with second information in one or more second fields of the first maneuver coordination message; and determining that a misbehavior condition exists in the first maneuver coordination message in response to determining that the first information in one or more first fields of the first maneuver coordination message is inconsistent with the second information in one or more second fields of the first maneuver coordination message.

Example 4. The method of any of examples 1-3, in which performing the test for misbehavior on the first maneuver coordination message includes determining whether information in a first maneuver coordination message type field is inconsistent with the presence or absence of one or more second fields.

Example 5. The method of any of examples 1-4, in which performing a test for misbehavior on the first maneuver coordination message includes determining whether information in a TRR location field is inconsistent with information in a TRR type field.

Example 6. The method of any of examples 1-5, in which performing the test for misbehavior on the first maneuver coordination message includes determining whether information in an executant ID field is inconsistent with information in a source ID field or information in a destination ID field.

Example 7. The method of any of examples 1-6, in which performing the test for misbehavior on the first maneuver coordination message includes determining whether information in a maximum speed field is inconsistent with a TRR location field.

Example 8. The method of any of examples 1-7, in which performing the test for misbehavior on the first maneuver coordination message includes determining whether first information in one or more fields related to an intended maneuver of the vehicle is inconsistent with second information in one or more second fields related to the intended maneuver of the vehicle.

Example 9. The method of any of examples 1-8, in which performing the test for misbehavior on the first maneuver coordination message includes determining whether first information in one or more fields related to an intended maneuver of the vehicle or second information in one or more second fields related to the intended maneuver of the vehicle exceeds a threshold.

Example 10. The method of any of examples 1-9, in which performing the test for misbehavior on the first maneuver coordination message includes determining whether first information in one or more fields related to an intended maneuver of the vehicle or second information in one or more second fields related to the intended maneuver of the vehicle indicate an overlap of a TRR.

Example 11. The method of any of examples 1-9, further including: receiving a second maneuver coordination message; determining whether first information in the first maneuver coordination message is inconsistent with second information in the second maneuver coordination message; and identifying a misbehavior condition in response to determining that the first information in the first maneuver coordination message is inconsistent with the second information in the second maneuver coordination message.

Example 12. The method of any of examples 1-11, in which the first maneuver coordination message and the second maneuver coordination message are out of sequence.

Example 13. The method of any of examples 1-12, in which performing a test for misbehavior on the first maneuver coordination message includes determining a quantity of maneuver request denials received from a remote vehicle associated with one or more requests to perform a maneuver sent by the vehicle to the remote vehicle; and identifying a misbehavior condition in response to determining that the quantity of maneuver request denials meets a request denial threshold.

Example 14. The method of example 13, further including: starting a timer associated with the one or more requests to perform a maneuver sent to the remote vehicle; and increment the quantity of maneuvering request denial upon expiration of the timer without receiving a response from the remote vehicle to the one or more requests.

Example 15. The method of example 13, further including: determining whether the remote vehicle is unable to respond to the one or more requests to perform the maneuver; and determining whether the remote vehicle is unable to perform an operation related to the one or more requests to perform the maneuver, in which identifying a misbehavior condition in response to determining that the quantity of maneuver request denials meets a request denial threshold includes identifying the misbehavior condition in response to determining that the remote vehicle is able to respond to the one or more requests to perform the maneuver, and that the remote vehicle is able to perform the operation related to the one or more requests perform the maneuver.

Example 16. A method performed by a network computing device processing system of a vehicle-to-everything (V2X) network for misbehavior detection in a maneuver coordination message, including: receiving a plurality of misbehavior reports indicating maneuver coordination message misbehavior from a plurality of vehicles; identifying an inconsistency among the plurality of misbehavior reports; identifying a misbehavior condition in response to identifying the inconsistency among the plurality of misbehavior reports; and taking an action in response to identifying the misbehavior condition.

Example 17. The method of example 16, in which identifying the inconsistency among the plurality of misbehavior reports includes identifying a vehicle impersonating multiple vehicles.

Example 18. The method of any of examples 16-17, in which identifying the inconsistency among the plurality of misbehavior reports includes identifying a vehicle identified in the plurality of maneuver coordination messages has not sent a misbehavior report to the network computing device.

Example 19. The method of any of examples 16-18, further comprising sending to a second network computing device a request for information related to the identified inconsistency among the plurality of misbehavior reports.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A vehicle-to-everything (V2X) processing system, comprising:
   a transceiver configure to receive maneuver coordination messages; and
   a processor coupled to the transceiver and configured to:
     receive a first maneuver coordination message;
     perform a test for misbehavior on the first maneuver coordination message, wherein to perform the test, the processor is further configured to:
       determine a quantity of maneuver request denials received from a remote vehicle associated with one or more requests to perform a maneuver sent by a vehicle to the remote vehicle; and
       identify a misbehavior condition in response to determining that the quantity of maneuver request denials meets a request denial threshold; and
     take an action in response to the test identifying misbehavior associated with the first maneuver coordination message.

2. The V2X processing system of claim 1, wherein to perform the test, the processor is further configured to determine whether a first field and a second field are inconsistent; and
   wherein to take the action in response to the test identifying misbehavior associated with the first maneuver coordination message, the processor is further configured to transmit a message associated with the first maneuver coordination message that includes an indication that information in the first field is inconsistent with information in the second field.

3. The V2X processing system of claim 1, wherein to perform the test, the processor is further configured to:
   determine whether first information in one or more first fields of the first maneuver coordination message is inconsistent with second information in one or more second fields of the first maneuver coordination message; and
   determine that a misbehavior condition exists in the first maneuver coordination message in response to determining that the first information in the one or more first fields of the first maneuver coordination message is inconsistent with the second information in the one or more second fields of the first maneuver coordination message.

4. The V2X processing system of claim 1, wherein to perform the test, the processor is further configured to determine whether information in the first maneuver coordination message type field is inconsistent with a presence or absence of one or more second fields.

5. The V2X processing system of claim 1, wherein to perform the test, the processor is further configured to determine whether information in a target road resource (TRR) location field is inconsistent with information in a TRR type field.

6. The V2X processing system of claim 1, wherein to perform the test, the processor is further configured to determine whether information in an executant ID field is inconsistent with information in a source ID field or information in a destination ID field.

7. The V2X processing system of claim 1, wherein to perform the test, the processor is further configured to determine whether information in a maximum speed field is inconsistent with a target road resource (TRR) location field.

8. The V2X processing system of claim 1, wherein to perform the test, the processor is further configured to determine whether first information in one or more fields related to an intended maneuver of the vehicle is inconsistent with second information in one or more second fields related to the intended maneuver of the vehicle.

9. The V2X processing system of claim 1, wherein to perform the test, the processor is further configured to determine whether first information in one or more fields related to an intended maneuver of the vehicle or second information in one or more second fields related to the intended maneuver of the vehicle exceeds a threshold.

10. The V2X processing system of claim 1, wherein to perform the test, the processor is further configured to determine whether first information in one or more fields related to an intended maneuver of the vehicle or second information in one or more second fields related to the intended maneuver of the vehicle indicate an overlap of a target road resource (TRR).

11. The V2X processing system of claim 1, wherein the processor is further configured to:
receive a second maneuver coordination message;
determine whether first information in the first maneuver coordination message is inconsistent with second information in the second maneuver coordination message; and
identify a misbehavior condition in response to determining that the first information in the first maneuver coordination message is inconsistent with the second information in the second maneuver coordination message.

12. The V2X processing system of claim 11, wherein the first maneuver coordination message and the second maneuver coordination message are out of sequence.

13. The V2X processing system of claim 1, wherein at least one of the maneuver request denials includes a maneuver request where a response timer has expired without receipt of a response to the maneuver request.

14. The V2X processing system of claim 1, wherein the processor is further configured to:
start a timer associated with the one or more requests to perform a maneuver sent to the remote vehicle; and
increment the quantity of maneuvering request denials upon expiration of the timer without receiving a response from the remote vehicle to the one or more requests.

15. The V2X processing system of claim 1, wherein the processor is further configured to:
determine whether the remote vehicle is unable to respond to the one or more requests to perform the maneuver; and
determine whether the remote vehicle is unable to perform an operation related to the one or more requests to perform the maneuver,
wherein the processor is further configured to identify a misbehavior condition in response to determining that the quantity of maneuver request denials meets the request denial threshold by identifying the misbehavior condition in response to determining that the remote vehicle is able to respond to the one or more requests to perform the maneuver, and that the remote vehicle is able to perform the operation related to the one or more requests perform the maneuver.

16. A method performed by a vehicle-to-everything (V2X) processing system of a vehicle for misbehavior detection in maneuver coordination messages, comprising:
receiving a first maneuver coordination message;
performing a test for misbehavior on the first maneuver coordination message, the test including:
determining a quantity of maneuver request denials received from a remote vehicle associated with one or more requests to perform a maneuver sent by the vehicle to the remote vehicle; and
identifying a misbehavior condition in response to determining that the quantity of maneuver request denials meets a request denial threshold; and
taking an action in response to the test identifying misbehavior associated with the first maneuver coordination message.

17. The method of claim 16, wherein:
receiving the first maneuver coordination message comprises receiving a first maneuver coordination message including a first field and a second field; and
taking the action in response to the test identifying misbehavior associated with the first maneuver coordination message comprises transmitting a message associated with the received first maneuver coordination message that includes an indication that information in the first field is inconsistent with information in the second field.

18. The method of claim 16, wherein performing the test for misbehavior on the first maneuver coordination message comprises:
determining whether first information in one or more first fields of a first maneuver coordination message is inconsistent with second information in one or more second fields of the first maneuver coordination message; and
determining that a misbehavior condition exists in the first maneuver coordination message in response to determining that the first information in the one or more first fields of the first maneuver coordination message is inconsistent with the second information in the one or more second fields of the first maneuver coordination message.

19. The method of claim 16, wherein performing the test for misbehavior on the first maneuver coordination message comprises determining whether information in a first maneuver coordination message type field is inconsistent with a presence or absence of one or more second fields.

20. The method of claim 16, wherein performing the test for misbehavior on the first maneuver coordination message comprises determining whether information in a target road resource (TRR) location field is inconsistent with information in a TRR type field.

21. The method of claim 16, wherein performing the test for misbehavior on the first maneuver coordination message comprises determining whether information in an executant ID field is inconsistent with information in a source ID field or information in a destination ID field.

22. The method of claim 16, wherein performing the test for misbehavior on the first maneuver coordination message comprises determining whether information in a maximum speed field is inconsistent with a target road resource (TRR) location field.

23. The method of claim 16, wherein performing the test for misbehavior on the first maneuver coordination message comprises determining whether first information in one or more fields related to an intended maneuver of the vehicle is inconsistent with second information in one or more second fields related to the intended maneuver of the vehicle.

24. The method of claim 16, wherein performing the test for misbehavior on the first maneuver coordination message comprises determining whether first information in one or more fields related to an intended maneuver of the vehicle or second information in one or more second fields related to the intended maneuver of the vehicle exceeds a threshold.

25. The method of claim 16, wherein performing the test for misbehavior on the first maneuver coordination message comprises determining whether first information in one or more fields related to an intended maneuver of the vehicle or second information in one or more second fields related to the intended maneuver of the vehicle indicate an overlap of a target road resource (TRR).

26. The method of claim 16, further comprising:
receiving a second maneuver coordination message;
determining whether first information in the first maneuver coordination message is inconsistent with second information in the second maneuver coordination message; and
identifying a misbehavior condition in response to determining that the first information in the first maneuver coordination message is inconsistent with the second information in the second maneuver coordination message.

27. The method of claim 26, wherein the first maneuver coordination message and the second maneuver coordination message are out of sequence.

28. The method of claim 16, wherein at least one of the maneuver request denials includes a maneuver request where a response timer has expired without receipt of a response to the maneuver request.

29. The method of claim 16, further comprising:
starting a timer associated with the one or more requests to perform a maneuver sent to the remote vehicle; and
increment the quantity of maneuvering request denials upon expiration of the timer without receiving a response from the remote vehicle to the one or more requests.

30. The method of claim 16, further comprising:
determining whether the remote vehicle is unable to respond to the one or more requests to perform the maneuver; and
determining whether the remote vehicle is unable to perform an operation related to the one or more requests to perform the maneuver,
wherein identifying a misbehavior condition in response to determining that the quantity of maneuver request denials meets the request denial threshold comprises identifying the misbehavior condition in response to determining that the remote vehicle is able to respond to the one or more requests to perform the maneuver, and that the remote vehicle is able to perform the operation related to the one or more requests perform the maneuver.

* * * * *